(12) United States Patent
Tomar et al.

(10) Patent No.: US 12,141,186 B1
(45) Date of Patent: Nov. 12, 2024

(54) TEXT EMBEDDING-BASED SEARCH TAXONOMY GENERATION AND INTELLIGENT REFINEMENT

(71) Applicant: Optum, Inc., Minnetonka, MN (US)

(72) Inventors: Ayush Tomar, Morgan Hill, CA (US); Zengpan Fan, Venice, FL (US); Ketki Savle, Atlanta, GA (US); Fazle Shahnawaz Muhibul Karim, Chicago, IL (US); Ramin Anushiravani, San Carlos, CA (US); Yizhao Ni, Centennial, CO (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/484,943

(22) Filed: Oct. 11, 2023

(51) Int. Cl.
G06F 16/35 (2019.01)
G06F 16/383 (2019.01)

(52) U.S. Cl.
CPC .......... *G06F 16/355* (2019.01); *G06F 16/383* (2019.01)

(58) Field of Classification Search
CPC .............................. G06F 16/355; G06F 16/383
See application file for complete search history.

(56) References Cited

U.S. PATENT DOCUMENTS

| | | | |
|---|---|---|---|
| 6,182,068 B1 | 1/2001 | Culliss | |
| 6,564,213 B1 | 5/2003 | Ortega et al. | |
| 6,738,754 B1 | 5/2004 | Norman, Jr. | |
| 8,100,829 B2 | 1/2012 | Rothman et al. | |
| 8,312,138 B2 | 11/2012 | Hull et al. | |
| 8,392,207 B2 | 3/2013 | Olaniyan | |

(Continued)

FOREIGN PATENT DOCUMENTS

| | | |
|---|---|---|
| CA | 2816517 A1 | 4/2012 |
| CA | 2836381 A1 | 11/2012 |

(Continued)

OTHER PUBLICATIONS

"Clinical Management Guidelines for Obstetrician-Gynecologists", The American College Of Obstetricians and Gynecologists Practice Bulletin, No. 109, Dec. 2009, pp. 1-12.

(Continued)

*Primary Examiner* — Jorge A Casanova
(74) *Attorney, Agent, or Firm* — Alston & Bird LLP

(57) ABSTRACT

Various embodiments of the present disclosure provide computer interpretation techniques for implementing a query resolution process to improve upon traditional search resolutions within a search domain. The techniques may include generating a plurality of interaction embeddings for a plurality of textual descriptions corresponding to a plurality of interaction codes identified within an interaction dataset and a plurality of taxonomy embeddings for a plurality of taxonomy categories identified within a taxonomy dataset. The techniques may include generating similarity scores for a plurality of description-category pairs based on a comparison between the plurality of interaction embeddings and the plurality of taxonomy embeddings. The techniques may include generating an enhanced taxonomy by augmenting one or more of the plurality of taxonomy categories with one or more of the plurality of textual descriptions based on the similarity scores and initiating, using the enhanced taxonomy, the performance of a query resolution operation.

18 Claims, 6 Drawing Sheets

(56) References Cited

U.S. PATENT DOCUMENTS

| | | | |
|---|---|---|---|
| 8,403,847 B2 | 3/2013 | Rothman et al. | |
| 8,583,450 B2 | 11/2013 | Baker et al. | |
| 8,706,530 B2 | 4/2014 | Ohnemus et al. | |
| 8,793,252 B2* | 7/2014 | Subasic | G06Q 30/02 706/14 |
| 8,972,397 B2 | 3/2015 | Imig et al. | |
| 8,996,314 B2 | 3/2015 | Ohnemus et al. | |
| 9,424,532 B1 | 8/2016 | Abedini et al. | |
| 9,436,760 B1 | 9/2016 | Tacchi et al. | |
| 10,026,114 B2 | 7/2018 | Tolvanen et al. | |
| 10,176,541 B2 | 1/2019 | Chaudhri et al. | |
| 10,262,384 B1 | 4/2019 | Albro et al. | |
| 10,394,894 B2 | 8/2019 | Garg et al. | |
| 10,409,874 B2 | 9/2019 | Cheng | |
| 10,413,779 B2 | 9/2019 | Ingram et al. | |
| 10,438,291 B1 | 10/2019 | Neben et al. | |
| 10,489,440 B2* | 11/2019 | Sharma | G06F 16/334 |
| 10,943,072 B1 | 3/2021 | Jaganmohan | |
| 11,055,324 B1 | 7/2021 | Inoue et al. | |
| 11,238,113 B2 | 2/2022 | Freese et al. | |
| 11,416,535 B2 | 8/2022 | Counts et al. | |
| 11,636,949 B2 | 4/2023 | Goldberg et al. | |
| 2002/0103680 A1 | 8/2002 | Newman | |
| 2003/0163349 A1 | 8/2003 | Ho | |
| 2004/0019601 A1* | 1/2004 | Gates | G06F 16/355 707/999.102 |
| 2005/0060194 A1 | 3/2005 | Brown | |
| 2005/0075931 A1 | 4/2005 | Pearson | |
| 2005/0165627 A1 | 7/2005 | Fotsch et al. | |
| 2008/0133272 A1 | 6/2008 | Marshall | |
| 2009/0132573 A1 | 5/2009 | Reed, Jr. et al. | |
| 2009/0254402 A1 | 10/2009 | Beall | |
| 2010/0063846 A1 | 3/2010 | Shakamuri | |
| 2010/0076786 A1 | 3/2010 | Dalton et al. | |
| 2010/0131482 A1 | 5/2010 | Linthicum et al. | |
| 2010/0131498 A1 | 5/2010 | Linthicum et al. | |
| 2010/0179839 A1 | 7/2010 | Collins et al. | |
| 2011/0077973 A1 | 3/2011 | Breitenstein et al. | |
| 2011/0161110 A1 | 6/2011 | Mault | |
| 2011/0264513 A1* | 10/2011 | Ratnaparkhi | G06Q 30/0246 705/14.45 |
| 2012/0089413 A1 | 4/2012 | Balassanian | |
| 2012/0296455 A1 | 11/2012 | Ohnemus et al. | |
| 2013/0024474 A1 | 1/2013 | Kraft et al. | |
| 2013/0073686 A1 | 3/2013 | Sandholm | |
| 2013/0211858 A1 | 8/2013 | Ohnemus et al. | |
| 2014/0067423 A1 | 3/2014 | Joao | |
| 2014/0088986 A1 | 3/2014 | Gowdy et al. | |
| 2014/0100860 A1 | 4/2014 | Stollmeyer et al. | |
| 2014/0129493 A1 | 5/2014 | Leopold | |
| 2014/0156308 A1 | 6/2014 | Ohnemus et al. | |
| 2014/0280289 A1 | 9/2014 | Marantz et al. | |
| 2014/0310013 A1 | 10/2014 | Ram et al. | |
| 2014/0316811 A1 | 10/2014 | Ohnemus et al. | |
| 2014/0372133 A1 | 12/2014 | Austrum et al. | |
| 2015/0234987 A1 | 8/2015 | Laing et al. | |
| 2015/0331878 A1 | 11/2015 | Joseph et al. | |
| 2016/0048646 A1 | 2/2016 | Stover et al. | |
| 2016/0078101 A1 | 3/2016 | Somaiya et al. | |
| 2016/0092598 A1 | 3/2016 | Mishra | |
| 2017/0249713 A1 | 8/2017 | Serbinis et al. | |
| 2017/0293923 A1 | 10/2017 | Margolis et al. | |
| 2017/0308583 A1 | 10/2017 | Husain et al. | |
| 2018/0025334 A1 | 1/2018 | Pourfallah et al. | |
| 2018/0082030 A1 | 3/2018 | Allen et al. | |
| 2018/0165288 A1 | 6/2018 | Chang et al. | |
| 2019/0171728 A1 | 6/2019 | Wakankar et al. | |
| 2020/0073953 A1 | 3/2020 | Kulkarni | |
| 2020/0092695 A1 | 3/2020 | Vigeant et al. | |
| 2020/0320139 A1 | 10/2020 | Duishoev et al. | |
| 2020/0342010 A1 | 10/2020 | Rosomoff | |
| 2020/0350072 A1 | 11/2020 | McEwing et al. | |
| 2020/0365259 A1 | 11/2020 | Chmait et al. | |
| 2020/0411146 A1 | 12/2020 | McEwing et al. | |
| 2021/0027870 A1 | 1/2021 | West | |
| 2021/0174164 A1 | 6/2021 | Hsieh et al. | |
| 2021/0209095 A1 | 7/2021 | Gallant | |
| 2021/0241204 A1 | 8/2021 | Stein | |
| 2021/0319520 A1 | 10/2021 | Winters | |
| 2021/0398077 A1 | 12/2021 | Lomurray et al. | |
| 2022/0005566 A1 | 1/2022 | Lyman et al. | |
| 2022/0035869 A1 | 2/2022 | Beck et al. | |
| 2022/0198573 A1 | 6/2022 | Brown et al. | |
| 2023/0138014 A1 | 5/2023 | Bjorkqvist | |
| 2023/0252338 A1* | 8/2023 | Ayyadevara | G16H 40/20 706/12 |
| 2023/0409614 A1 | 12/2023 | Hamilton et al. | |
| 2024/0054326 A1 | 2/2024 | Dave et al. | |
| 2024/0265431 A1* | 8/2024 | Jimenez Cabello | G06N 7/01 |

FOREIGN PATENT DOCUMENTS

| | | |
|---|---|---|
| CA | 2841006 A1 | 1/2013 |
| CN | 103329135 A | 9/2013 |
| CN | 107665217 A | 2/2018 |
| CN | 108304439 B | 7/2021 |
| EP | 2622568 A1 | 8/2013 |
| EP | 2710503 A1 | 3/2014 |
| EP | 2729912 A1 | 5/2014 |
| IN | 201941028487 A | 1/2021 |
| WO | 2012/050969 A1 | 4/2012 |
| WO | 2012/156374 A1 | 11/2012 |
| WO | 2013/004706 A1 | 1/2013 |
| WO | 2014/087252 A2 | 6/2014 |

OTHER PUBLICATIONS

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.

Bao, et al., "Medical Code Prediction via Capsule Networks and ICD Knowledge", BMC Medical Informatics and Decision Making, vol. 21 (Suppl. 2):55, Jul. 30, 2021, (12 pages), doi.org/10.1186/s12911-021-01426-9.

Chapelle, Olivier et al. "A Dynamic Bayesian Network Click Model For Web Search Ranking," In Proceedings of the 18th International Conference On World Wide Web, Apr. 20, 2009, pp. 1-10, Madrid, Spain, available online at https://citeseerx.ist.psu.edu/viewdoc/download?doi=10.1.1.180.337&rep=rep1&type=pdf.

Dao, Tien Tuan et al. "Knowledge-Based Personalized Search Engine For The Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Galli, Keith. Galli K. "High-Performance Intent Classification In Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Gupta, Jai et al. "Personalized Online Spell Correction For Personal Search," In Proceedings of the 2019 World Wide Web Conference (WWW'19), May 13-17, 2019, (7 pages), DOI: 10.1145/3308558.3313706.

Hwang, Sewoong et al. "Toward A Chatbot For Financial Sustainability," Sustainability, vol. 13, No. 6:3173, Mar. 13, 2021, pp. 1-18, DOI: 10.3390/su13063173.

International Search Report and Written Opinion for International Application No. PCT/US2023/015396, dated Jun. 19, 2023, (13 pages), European Patent Office, Rijswijk, Netherlands.

Li, Jianqiang et al. "Diversity-Aware Retrieval Of Medical Records," Computers In Industry, vol. 29, pp. 81-91, May 2015, DOI: http://dx.doi.org/10.1016/j.compind.2014.09.004.

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

(56) References Cited

OTHER PUBLICATIONS

Miller, Alissa S. et al. "Improving Stage Of Change In An Employee Wellness Program," Workplace Health & Safety, vol. 67, No. 8, pp. 381-290, Aug. 2019, DOI: 10.1177/2165079919838291.

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.

Non-Final Rejection Mailed on Feb. 26, 2024 for U.S. Appl. No. 17/971,491, 11 page(s).

Non-Final Rejection Mailed on Mar. 13, 2024 for U.S. Appl. No. 17/934,688, 20 page(s).

Perrault, Evan K. et al. "Employees' Refusals To Participate In An Employer-Sponsored Wellness Program: Barriers and Benefits To Engagement," Compensation & Benefits Review, vol. 52, No. 1, p. 8-18, Jan. 2020, DOI: 10.1177/0886368719899209.

Sun, Xu et al. "Feature-Frequency-Adaptive On-Line Training For Fast and Accurate Natural Language Processing," Computational Linguistics, vol. 40, No. 3, pp. 563-586, Sep. 1, 2014, DOI: 10.1162/COLL_a_00193.

U.S. Provisional Patent Application, "Automated Health Data Acquisition, Processing And Communication System", Unpublished (filing date Nov. 30, 2012), (Peter Ohnemus, Inventor), 98 pages, U.S.A., U.S. Appl. No. 61/732,203.

U.S. Provisional Patent Application, "Health Data Acquisition, Processing and Communication System", Unpublished (filing date Jun. 9, 2011), (Peter Ohnemus, Inventor), 50 pages, U.S.A., U.S. Appl. No. 61/495,247.

U.S. Provisional Patent Application, "Health Data Acquisition, Processing and Communication System", Unpublished (filing date Sep. 29, 2010), (Peter Ohnemus, Inventor), 31 pages, U.S.A., U.S. Appl. No. 61/387,906.

U.S. Provisional Patent Application, "System And Method For Personal Energy Expenditure Analyses", Unpublished (filing date May 16, 2011), (Peter Ohnemus, Inventor), 35 pages, U.S.A., U.S. Appl. No. 61/486,658.

Wu, Qiang et al. "Adapting Boosting For Information Retrieval Measures," Learning To Rank For Information Retrieval, vol. 13, pp. 254-270, Jun. 2010, DOI: https://citeseerx.ist.psu.edu/viewdoc/download?doi=10.1.1.157.5117&rep=rep1&type=pdf.

Yadav, Nishant et al. "Session Aware Query Auto Completion Using Extreme Multi-Label Ranking," arXiv Preprint arXiv:2012.07654v2 [cs.IR], Jun. 7, 2021, (10 pages), available online: https://assets.amazon.science/5e/76/6ebacfc240e1a58b69a6f5347833/session-aware-query-auto-completion-using-extreme-multi-label-ranking.pdf.

Lemoine, Julien, et al., "Predictive Search and Autocomplete", Algolia Blog, (14 pages), Dec. 6, 2022, Retrieved from the Internet https://web.archive.org/web/20221206165729/https://www.algolia.com/blog/ai/predictive-search-and-autocomplete/.

\* cited by examiner

TEXT EMBEDDING-BASED SEARCH TAXONOMY GENERATION AND INTELLIGENT REFINEMENT

BACKGROUND

Various embodiments of the present disclosure address technical challenges related to the search query resolution generally and, more specifically, the use of textual embeddings for contextual query resolution in complex search domains. Traditionally, user queries are mapped to potential search results through keyword matching techniques in which terms within a query string are syntactically matched to potential results. The results may vary depending on the search domain. For example, in a clinical domain the potential results may include a set of healthcare providers, provider specialties, and/or the like. Traditional, syntactic-based search techniques fail to account for contextual information associated with a query which results in poor retrieval performance. Retrieval performance may be particularly poor in search domains with diverse result mappings, such as in a clinical domain where a healthcare provider may be associated with multiple specialties complicating the retrieval specific healthcare providers in response to a search query referencing a specialty.

Another technical challenge of syntactic search techniques, such as keyword searches, is the prevalence of null results. Null results, for example, may occur in the event that no potential search result syntactically matches a term within a user's query. In such a case, a user may be provided no search results. To avoid null results, some search techniques leverage comprehensive taxonomies, such as a National Uniform Claim Committee (NUCC) taxonomy for a clinical domain, to contextualize potential search results with additional searchable information (e.g., grouping terminology, classifications, specialization, definitions, display names, etc.). However, such information may be too generic to improve search results, reliably provide accuracy search results and is insufficient for successful retrieval. Adding targeted contextual information to improve search results is time consuming, research intensive, and is prone to errors.

Various embodiments of the present disclosure make important contributions to traditional search query resolution techniques by addressing each of these technical challenges.

BRIEF SUMMARY

Various embodiments of the present disclosure provide deep learning-based solutions to intelligently enhance traditional taxonomies with targeted contextual information. Using some of the techniques of the present disclosure, relevant contextual information, such as diagnosis and procedure code descriptions in a clinical domain, may be semantically mapped to potential search results, such as clinical specialties in the clinical domain. By doing so, a taxonomy defining a generic set of potential search results may be automatically refined with contextual, searchable information to improve retrieval operations in search engines for any search domain.

In some embodiments, a computer-implemented method includes generating, by one or more processors, a plurality of interaction embeddings for a plurality of textual descriptions corresponding to a plurality of interaction codes identified within an interaction dataset; generating, by the one or more processors, a plurality of taxonomy embeddings for a plurality of taxonomy categories identified within a taxonomy dataset; generating, by the one or more processors, a plurality of similarity scores for a plurality of description-category pairs based on a comparison between the plurality of interaction embeddings and the plurality of taxonomy embeddings; generating, by the one or more processors, an enhanced taxonomy by augmenting one or more of the plurality of taxonomy categories with one or more of the plurality of textual descriptions based on the plurality of similarity scores; and initiating, by the one or more processors and using the enhanced taxonomy, the performance of a query resolution operation.

In some embodiments, a computing system comprises memory and one or more processors communicatively coupled to the memory, the one or more processors are configured to generate a plurality of interaction embeddings for a plurality of textual descriptions corresponding to a plurality of interaction codes identified within an interaction dataset; generate a plurality of taxonomy embeddings for a plurality of taxonomy categories identified within a taxonomy dataset; generate a plurality of similarity scores for a plurality of description-category pairs based on a comparison between the plurality of interaction embeddings and the plurality of taxonomy embeddings; generate an enhanced taxonomy by augmenting one or more of the plurality of taxonomy categories with one or more of the plurality of textual descriptions based on the plurality of similarity scores; and initiate, using the enhanced taxonomy, the performance of a query resolution operation.

In some embodiments, one or more non-transitory computer-readable storage media includes instructions that, when executed by one or more processors, cause the one or more processors to generate a plurality of interaction embeddings for a plurality of textual descriptions corresponding to a plurality of interaction codes identified within an interaction dataset; generate a plurality of taxonomy embeddings for a plurality of taxonomy categories identified within a taxonomy dataset; generate a plurality of similarity scores for a plurality of description-category pairs based on a comparison between the plurality of interaction embeddings and the plurality of taxonomy embeddings; generate an enhanced taxonomy by augmenting one or more of the plurality of taxonomy categories with one or more of the plurality of textual descriptions based on the plurality of similarity scores; and initiate, using the enhanced taxonomy, the performance of a query resolution operation.

DETAILED DESCRIPTION

Figure 1:
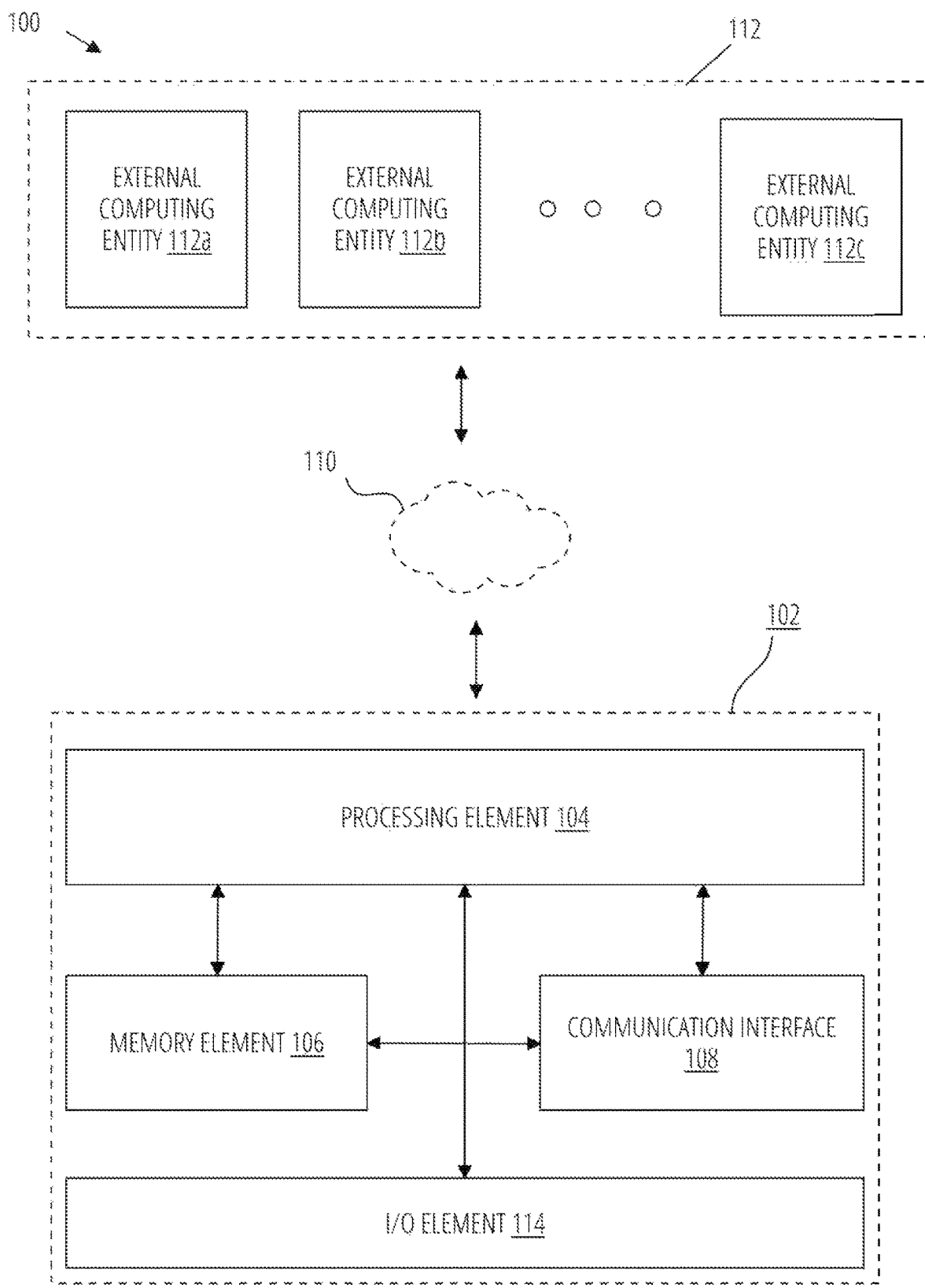
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to predictive data analysis, one of ordinary skills in the art will recognize that the disclosed concepts may be used to perform other types of data analysis.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., semantic matching techniques, query resolution techniques, and/or the like) described herein.

The external computing entities 112a-c, for example, may include and/or be associated with one or more entities that may be configured to receive, store, manage, and/or facilitate datasets, such as interaction datasets, taxonomy datasets, and/or the like. The external computing entities 112a-c may provide such datasets, and/or the like to the predictive computing entity 102 which may leverage the datasets to generate, modify, and/or evaluate enhanced taxonomies. In some examples, the datasets may include an aggregation of data from across the external computing entities 112a-c into one or more aggregated datasets. The external computing entities 112a-c, for example, may be associated with one or more data repositories, cloud platforms, compute nodes, organizations, and/or the like, that may be individually and/or collectively leveraged by the predictive computing entity 102 to obtain and aggregate data for a search domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
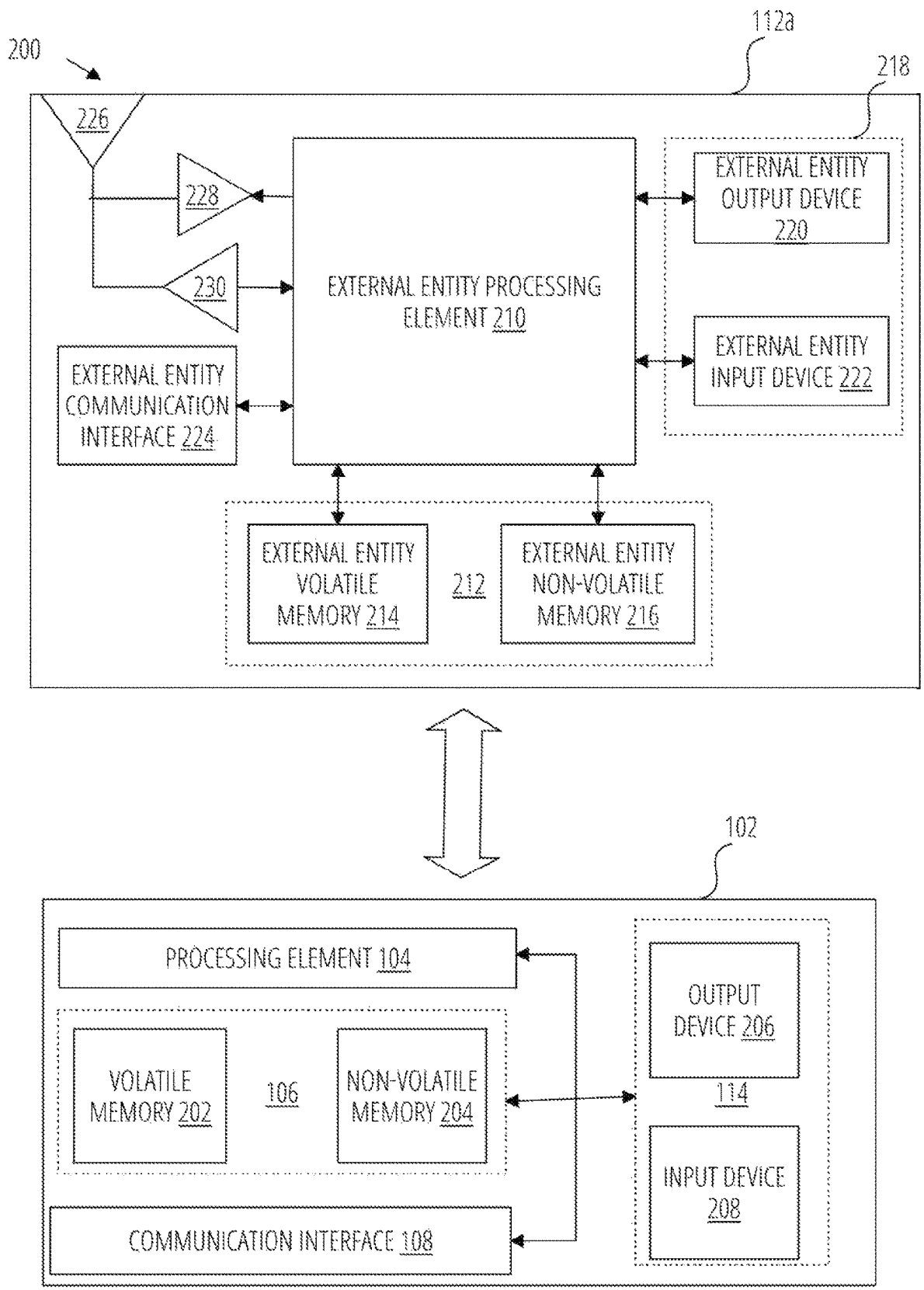
FIG. 2 is a schematic diagram showing a system computing architecture in accordance with one or more embodiments of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product which includes non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "taxonomy dataset" refers to a data entity that describes one or more search categories for a search domain. The taxonomy dataset, for example, may include a plurality of taxonomy categories. A taxonomy category may be an attribute, field, and/or the like that is defined by the taxonomy dataset. For example, the taxonomy dataset may include a taxonomy code, display name, grouping, specialization, classification, definition, and/or any other contextual information for identifying a sematic meaning of a search query. For instance, the taxonomy dataset may define a plurality of taxonomy categories that correspond to one or more types of potential search results for a search query. In this manner, the taxonomy dataset may be leveraged to identify a type of search query and surface a query resolution based on the type of search query.

In some examples, the taxonomy dataset may depend on the search domain. For example, in a clinical domain, a taxonomy category may be a specialization category. By way of example, the taxonomy categories may be indicative of syntactic data that describes the type, classification, and/or specialization of a plurality of healthcare providers. In this way, the taxonomy dataset may be leveraged to identify a type of healthcare providers for a search query and surface a query resolution with one or more healthcare providers of the identified type. In some examples, the taxonomy dataset may be based on an open-source taxonomy. By way of example, the taxonomy dataset may include and/or be based on an NUCC taxonomy.

In some embodiments, the term "taxonomy category" refers to a component of a taxonomy dataset. A taxonomy category, for example, may define a code, display name, grouping, specialization, classification, definition, and/or any other contextual information associated with a particular search query and/or one or more potential results for the search query. Each taxonomy category may be indicative of a classification and/or one or more classification attributes. For instance, a taxonomy category may include classification characterized by a name, description, one or more sub- and/or related classifications, and/or the like.

In some examples, a taxonomy category may depend on the search domain. For example, in a clinical domain, a taxonomy category may correspond to a clinical specialization. By way of example, a taxonomy category may include a specialization category, one or more sub- and/or related specializations, a specialization name, a description of the specialization, and/or the like. In some examples, a taxonomy category may include a category defined by an NUCC taxonomy.

In some embodiments, the term "interaction dataset" refers to a data entity that includes a plurality of interaction data objects. The interaction dataset may include a set of interaction data objects that are recorded over a time interval. For instance, the interaction dataset may include a plurality of interaction data objects that are associated with a time interval. The time interval, for example, may be based on a refresh rate that defines one or more of one or more historical refresh times and/or one or more future refresh times for an enhanced taxonomy.

In some examples, the interaction dataset may be based on a search domain. For example, in clinical domain, the interaction dataset may include medical claim data with a plurality of historical medical claims across a population of users. In some examples, the medical claim data may be accessed from electronic health records (EHR) to collect a past medical history of events and/or interactions for a population of users. For instance, as described herein, the medical claims data may be indicative of a plurality of International Classification of Diseases (ICD) and/or Current Procedural Terminology (CPT) codes referenced across a population of users over a time interval.

In some embodiments, the term "interaction data object" refers to a data entity that describes a component of an interaction dataset. An interaction data object may include a recorded interaction for an individual. An interaction data object may depend on a search domain. For example, in a clinical domain, an interaction dataset may include a medical claim, a medical record, and/or any other recorded medium that is descriptive of a medical event for an individual. In some embodiments, an interaction data object may include one or more interaction codes. In addition, or alternatively, the interaction data object may include contextual data associated with interaction codes.

In some embodiments, the term "interaction code" refers to an alpha-numerical reference that designates a particular aspect of an interaction. In a clinical domain, for example, an interaction code may be based on one or more healthcare claim feature values that describe at least one of a healthcare claim's procedure type, diagnosis code, medical equipment, insurer requirements, physician deadlines, and/or the like. For example, in a clinical domain, an interaction code may include an ICD code that is indicative of a diagnosis of a disease for an individual. In addition, alternatively, in a clinical domain, an interaction code may include a CPT code that is indicative of a treatment for a condition of an individual. In some examples, a plurality of interaction data objects may include a list of ICD codes and/or CPT codes, such as ICD-10-CM codes, and/or the like, that are recorded for an individual during a time interval. In some examples, each interaction code may correspond to an event for an individual. The event, for example, may include a diagnosis for a disease corresponding to the interaction code. In some examples, the presence of an interaction code within a plurality of interaction data objects may be indicative of the occurrence of an event (e.g., a disease diagnosis, a treatment) for an individual within a historical time interval.

In some embodiments, an interaction code is associated with a particular textual description that describes, elaborates, and/or details a condition and/or treatment associated with the interaction code. The textual description, for example, may include contextual information, such as medically relevant information in a clinical domain, for the interaction code. For example, the interaction code may have a standardized textual description explaining relevant clinical information such as the name, causes, symptoms, history, treatments, abnormal findings, etc., of a corresponding diagnosis, procedure, and/or the like. In this manner, the interaction code may be used to identify contextual information, such as medically relevant information in a clinical domain, relating to an event recorded by an interaction code within an interaction data object.

In some embodiments, the term "textual descriptions" refers to semantic content that elaborates on the meaning, purpose, and/or context of an entity. A textual description may be based on a search domain. For example, in a clinical domain, a textual description may include clinically relevant information. For instance, a textual description may be a standardized and/or non-standardized description associated with a particular term code, listing, and/or the like. In some embodiments, a textual description may be a description associated with a particular ICD-10 code, CPT code, and/or the like. In some examples, a textual description comprises syntactic content associated with a particular ICD-10 code, CPT code, and/or the like.

In some embodiments, the term "embeddings" refers to a data entity that describes a mathematical representation of textual information. Embeddings may be fixed-length vectors that represent words and/or sentences. A plurality of embedding vectors may define a latent space in which information and relationships may be represented. Embeddings may be generated to transform text-based information into numerical representations for further computer-based processing, for example, in natural language processing applications. An embedding may capture raw information, summary information, semantic information, and/or the like. Embeddings may be used to match, compare and/or generally interact with textual information in computer-based applications. For example, embeddings may be used to determine if two or more sentences are similar, for example, by the words they share and/or the meanings they convey. As described herein, a plurality of embeddings may be generated for a plurality of different sources of information. In some examples, embeddings may be generated for interaction codes, taxonomy categories, search queries, enhanced taxonomy categories, and/or the like.

In some embodiments, the term "interaction embedding" refers to an embedding for an interaction code. For example, an interaction embedding may encode a plurality of features for a respective interaction code. In some examples, the plurality of features may include textual features described by a textual description of an interaction code. By way of example, an interaction embedding may include a textual embedding generated for an interaction code based on the interaction code's corresponding textual description.

In some embodiments, the term "taxonomy embedding" refers to an embedding for a taxonomy category. For example, a taxonomy embedding may encode a plurality of features for a respective taxonomy category. In some examples, the plurality of features may include textual features described by a taxonomy dataset with respect to a taxonomy category. By way of example, a taxonomy embedding may include a textual embedding generated for a taxonomy category based on one or more classification attributes (e.g., name, description, one or more sub- and/or related classifications, etc.) corresponding to taxonomy category.

In some embodiments, the term "machine learning embedding model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A machine learning embedding model may include one or more machine learning models configured, trained (e.g., jointly, separately, etc.), and/or the like to encode textual data into one or more embeddings. A machine learning embedding model may include one or more of any type of machine learning model including one or more supervised, unsupervised, semi-supervised, reinforcement learning models, and/or the like. In some examples, a machine learning embedding model may include multiple models configured to perform one or more different stages of an embedding process.

In some embodiments, a machine learning embedding model is trained using one or more supervised training techniques. In some examples, a machine learning embedding model may be trained to factorize one or more inputs, such as one or more text strings, to generate an embedded vector. In some examples, a machine learning embedding model may be trained such that the model's latent space is representative of certain semantic domains/contexts, such as clinical domain. For example, a machine learning embedding model may be trained to generate embeddings representative of one or more learned (and/or prescribed, etc.) relationships between one or more words, phrases, and/or sentences. By way of example, a machine learning embedding model may represent a semantic meaning of a word and/or sentence differently in relation to other words and/or sentences, and/or the like. The machine learning embedding model may include any type of embedding model finetuned on information for a particular search domain. By way of example, a machine learning embedding model may include one or more of SBERT, ClinicalBERT, BERT, Word2Vec, GloVe, Doc2Vec, InferSent, Universal Sentence Encoder, and/or the like. A machine learning embedding model may be finetuned on an interaction dataset, a plurality of historical search queries, and/or the like.

In some embodiments, the term "description-category pair" refers to tuple including a textual description and taxonomy category. A description-category pair may be associated with an interaction embedding (e.g., corresponding to a respective textual description) and/or a taxonomy embedding (e.g., corresponding to a respective taxonomy category). In some examples, a similarity score may be generated for a description-category pair based on the associated embeddings. In some examples, a description-category pair may be representative of a textual description that is a candidate for being mapped, associated, appended, and/or the like to corresponding taxonomy category. In some examples, in the event that a similarity score for a description-category pair satisfies a threshold similarity score, a textual description of the description-category pair may be mapped, associated with, appended, and/or the like with a taxonomy category of the description-category pair.

In some embodiments, the term "similarity score" refers to data entity that describes a statistical measure of a strength of a relationship between two variables. In some examples, a similarity score may include a semantic similarity score. For example, the similarity score may be representative of a semantic similarity between two texts based on their associated embeddings. For instance, once data is converted to an associated embedding, the distance between two embeddings may be calculated to determine their similarity and/or dissimilarity. In some examples, embeddings that are closer in a vector space may be similar in semantic meaning. By way of example, a similarity score between two embeddings may be computed according to cosine similarity according to the following equation:

$$\text{cosine similarity} = S_C(A, B) := \cos(\theta) = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}},$$

where A and B represent embedding vectors. The similarity score may be a cosine similarity, a Euclidean distance, a dot product, and/or any other metric for measuring a similarity between two embeddings.

In some embodiments, the term "enhanced taxonomy" refers to a taxonomy dataset that is augmented with a plurality of augmented taxonomy categories. Augmented taxonomy categories, for example, may include a taxonomy category that is augmented with at least a portion of a textual description corresponding to an associated interaction code. In some examples, an augmented taxonomy category is generated by mapping, associating with, appending, and/or the like a textual description (at least a portion thereof) to a taxonomy category. In this manner, the taxonomy dataset may be augmented to generate the enhanced taxonomy with a plurality of augmented taxonomy categories. By increasing the contextual information for the taxonomy categories of the taxonomy dataset, the enhanced taxonomy may be leveraged to make more relevant and targeted connections between a search query and a plurality of potential search results. This, in turn, enables more accuracy query resolutions, while preventing null results that are predominant in traditional query resolution techniques.

In some embodiments, the term "threshold similarity score" refers to a threshold metric associated with a similarity score. A threshold similarity score, for example, may include static and/or dynamic value, range of values, and/or the like that defines a target similarity score for associating a textual description and taxonomy category of a description-category pair. A threshold similarity score, for example, may include a preset value, such as 0.95, 0.96, 0.97, 0.99, and/or the like. In addition, or alternatively, the threshold similarity score may include a range of value, such as 0.95 to 0.99, and/or the like. In some examples, a textual description and taxonomy category of a description-category pair may be associated in the event that a similarity score for the description-category pair achieves (e.g., equals or exceeds, etc.) the threshold similarity score.

In some examples, the threshold similarity score may be set and/or updated manually, automatically, algorithmically, as a parameter of a machine learning model, and/or the like. The threshold similarity score, for example, may be set and/or updated based on an evaluation metric. An evaluation metric may be used to evaluate, at least in part, the influence of different threshold similarity scores on an enhanced taxonomy's performance. In some embodiments, the threshold similarity score influences the performance of an enhanced taxonomy with respect to certain operations. Different values used for the threshold similarity scores may correspond to different evaluation metric values. The value selected for a threshold similarity score may be based on an evaluation metric. In some embodiments, a threshold similarity score may be arbitrarily and/or systematically set at some value and updated based on an evaluation metric. For example, a threshold similarity score may set to a value of 0.95, and later, the threshold similarity score may be updated to another value, for example, 0.94, 0.96, or any other value. If, for example, the threshold similarity score being updated to 0.96 corresponds with an increased evaluation metric value, it may be determined that the threshold similarity score should be 0.96.

In some embodiments, the term "threshold redundancy value" refers to a threshold metric associated with a taxonomy category. For example, a threshold redundancy value may include a static and/or dynamic value, range of values, and/or the like that defines a target number of taxonomy categories to which a textual description may be mapped, associated, appended to, and/or the like. For instance, a threshold redundancy value may be indicative of a maximum number of taxonomy categories that may be associated with a particular textual description for a particular interaction code. In this manner, generalized textual descriptions that are applicable to a plurality of taxonomy categories may be constrained to a subset of the related taxonomy categories to prevent oversaturation of an enhanced taxonomy with the prevalent textual descriptions.

A threshold redundancy value, for example, may include a preset value, such as three, four, ten, twenty, and/or the like. In addition, or alternatively, the threshold redundancy value may include a range of values, such as three to ten, and/or the like. In some examples, a textual description may be mapped to a threshold number of taxonomy categories as prescribed by the threshold redundancy value. In some examples, the textual description may be mapped regardless of the threshold similarity score. In some examples, the textual description may be mapped only if both the threshold similarity score and the threshold redundancy value are adhered to. For example, if a textual description is mapped, associated, appended to, and/or the like to a threshold number of taxonomy categories that satisfies the threshold redundancy value (e.g., equals or exceeds, etc.), the textual description may be removed as a candidate for mapping, associating, appending to, and/or the like, additional taxonomy categories, even if satisfying the threshold similarity score.

In some embodiments, the threshold redundancy value may be set and/or updated manually, automatically, algorithmically, as a parameter of a machine learning model, and/or the like. The threshold redundancy value, for example, may be set and/or updated based on an evaluation metric. An evaluation metric may be used to evaluate, at least in part, the influence of different threshold redundancy values on an enhanced taxonomy's performance. In some embodiments, the threshold redundancy value influences the performance of an enhanced taxonomy with respect to certain operations. Different values used for the threshold redundancy value may correspond to different evaluation metric values. The value chosen for the updated threshold redundancy value may be based on an evaluation metric. In some embodiments, a threshold redundancy value may be arbitrarily or systematically set at some value and updated based on an evaluation metric. For example, a threshold redundancy value may be set to a value of three, and later, the threshold redundancy value may be updated to another value, for example, two, four, and/or any other value. If, for example, the threshold redundancy value being updated to four corresponds with an increased evaluation metric value, the threshold redundancy value may be set to four.

In some embodiments, the term "query resolution" refers to the initiation, execution, and/or processing of a search query. A search query may be a search term or string from a user. A query resolution may be the process or output of the process that executes to return to the user information determined to be most relevant to the user based on the search query. In some embodiments, a query resolution is performed by a query resolution system. In some embodiments, a query resolution system uses an enhanced taxonomy as a part of the query resolution. The query results from a query resolution may be in the form of an answer, a curated list of facts or details, a suggestion, a link, and/or the like. In some embodiments, a user may use a query resolution system where the query resolution system receives information from an enhanced taxonomy as part of performing the query resolution.

In some embodiments, a user may input a search query, for example, "my child's stomach hurts". In response, a query resolution system, in combination with an enhanced taxonomy, may provide a list of healthcare providers and their associated information. The query resolution system may receive healthcare providers' associated information from the enhanced taxonomy in response to a determination that those healthcare providers have provided treatments associated with the search query. For example, in response to the search query, "my child's stomach hurts", information about healthcare providers associated with treatments for upper abdominal pains and pediatrics may be returned.

In some embodiments, the term "search query" refers to a data entity that describes textual information indicative of a request for information. The textual information may be input by a user through one or more user interfaces (e.g., typed through a keyboard, etc., transcribed from one or more audio inputs, and/or the like). The search query may include a plurality of query terms that are indicative of one or more features of the search query.

In some embodiments, the term "query term" refers to a data entity that describes a unit of text from a search query. A query term may include a keyword, phrase, and/or the like from the search query. By way of example, a query term may include one or more words and/or phrases extracted from the search query using one or more text extraction techniques (e.g., machine learning extraction models, rule-based extraction models, and/or the like).

In some embodiments, the term "term embedding" refers to an embedding for a query term. For example, a term embedding may encode a plurality of features for a respective query term and/or search query associated therewith. In some examples, the plurality of features may include textual features described by the search query, one or more contextual features associated with the query term (e.g., a position of the term, a semantic meaning for the term, one or more associated terms, such as synonyms, etc.), and/or the like.

In some embodiments, the term "enhanced embedding" refers to an embedding for an augmented taxonomy category. For example, an enhanced embedding may encode a plurality of features for a respective augmented taxonomy category. In some examples, the plurality of features may include textual features described by an enhanced taxonomy with respect to an augmented taxonomy category. By way of example, an enhanced embedding may include a textual embedding generated for an augmented taxonomy category based on one or more classification attributes (e.g., name, description, one or more sub- and/or related classifications, etc.) corresponding to the augmented taxonomy category and/or one or more textual descriptions for one or more interaction codes associated with the augmented taxonomy category.

In some embodiments, the term "query-augmented category pair" refers to tuple including a query term and an augmented taxonomy category. A query-augmented category pair may be associated with a term embedding (e.g., corresponding to a respective query term) and/or an enhanced embedding (e.g., corresponding to a respective augmented taxonomy category). In some examples, a query similarity score may be generated for a query-augmented category pair based on the associated embeddings. In some examples, a query-augmented category pair may be representative of an augmented taxonomy category that is a candidate for being associated with a search query. For instance, query-augmented category pairs may be representative of augmented taxonomy categories that are candidates for being used in a query resolution associated with the corresponding search query. By way of example, if a query similarity score is generated for a query-augmented category pair and satisfies one or more thresholds, information from the augmented taxonomy category may be leveraged to generate one or more search results for a query resolution.

In some embodiments, the term "query similarity score" refers to a data entity that describes a statistical measure of a strength of a relationship between two variables. In some examples, the query similarity score may include a semantic similarity score between a query term and/or an augmented taxonomy category. For example, the query similarity score may be representative of a semantic similarity between the query term and/or the augmented taxonomy category based on their associated embeddings. The query similarity score, for example, may be a cosine similarity, a Euclidean distance, a dot product, and/or any other metric for measuring a similarity between two embeddings.

In some embodiments, the term "interactive user data" refers to a data entity that describes one or more user interactions with the query resolution. The user interactions, for example, may include one or more selections (e.g., clicks, keyboard strokes, and/or the like) of one or more query results of a query resolution. In some examples, interactive user data may be used to recreate historical query resolutions. For example, a reference query resolution may have a plurality of associated interactive user data including search queries and/or query results. Such interactive user data may be leveraged to recreate similar query resolutions, for example, using the enhanced taxonomy.

In some embodiments, the term "evaluation metric" refers to a data entity that describes a statistical measure of the performance of a query resolution technique (e.g., implemented on one or more different computing systems). For example, an evaluation metric may be used to measure a retrieval rate for query resolution technique that leverages the enhanced taxonomy. As an example, an evaluation metric may include a recall metric according to the following equation:

$$r = \frac{\text{\# of our recommendations that are relevant}}{\text{\# of all the possible relevant items}}$$

In some examples, the evaluation metric is indicative of a performance of the enhanced taxonomy with respect to query resolution operations. For example, changing parameters, values, or the composition of the enhanced taxonomy may yield different evaluation metric values. An evaluation metric may be used to evaluate, at least in part, the influence of different data, parameters and/or compositions on an enhanced taxonomy's performance. In some examples, the evaluation metric is a recall metric for the enhanced taxonomy that is generated based on a plurality of received historical query resolutions and interactive user data indicative of a user's interaction with the historical query resolutions. The interactive user data, for example, may be leveraged as ground truths for comparing the efficacy of a particular query resolution.

In some examples, a plurality of nonenhanced query resolutions is received from a reference query resolution technique that performs query resolution operations without the enhanced taxonomy. In addition, or alternatively, nonenhanced interactive user data may be received for the nonenhanced query resolutions. In some examples, a plurality of enhanced query resolutions is received from an enhanced query resolution technique that performs query resolution operations with the enhanced taxonomy. In addition, or alternatively, enhanced interactive user data may be received for the enhanced query resolutions. In some examples, to evaluate the performance of the enhanced taxonomy, an evaluation metric may be generated based on a comparison between (i) a nonenhanced evaluation metric that is derived from a comparison between the nonenhanced query resolutions and the nonenhanced interactive user data and (ii) an enhanced evaluation metric that is derived from a comparison between the enhanced query resolutions and the enhanced interactive user data. In some examples, the evaluation metric may be calculated as the number of matching results between the plurality of nonenhanced query resolutions and enhanced query resolutions divided by the total number of possible query resolutions.

IV. Overview

Embodiments of the present disclosure present machine learning and query resolution techniques that improve computer interpretation through semantically mapping tailored contextual information to generic taxonomies. Traditional approaches for resolving queries through semantic matching rely on indices of information for a particular search domain that may be defined by generalized taxonomies. Such taxonomies may be dependent on the knowledge of users, such as subject matter experts, within the search domain and are generalized to accommodate multiple interpretations for general categories with information within the search domain. The generalized nature of traditional taxonomies leads to null results, poor retrieval rates, and inaccurate query resolutions for search queries. These poor results are exacerbated in search domains with dense knowledge bases that are unfamiliar to the users that perform search queries. The computer interpretation techniques of the present disclosure intelligently enhance generalized taxonomies with contextual information to accommodate for intelligence gaps in a population of users. By doing so, an enhanced taxonomy may be generated that includes semantic information to reduce null results and improve retrieval rates and the accuracy of query resolutions for search queries. Ultimately, the computer interpretation techniques of the present disclosure may be practically applied to improve the performance of traditional query engines.

In some embodiments, an enhanced taxonomy may be generated for any search domain by intelligently mapping contextual data to generalized taxonomy categories defined by a taxonomy dataset. For example, in a clinical domain, an enhanced taxonomy may be generated from an NUCC taxonomy by augmenting traditional taxonomy categories with textual descriptions associated with medical codes that correspond to each respective category. By doing so, traditionally generic categories defined by the NUCC taxonomy may be refined with granular medical code description that may improve semantic similarity score between the enhanced categories and the query terms from a search query. A search engine may leverage the enhanced taxonomy to generate more detailed connections between a search query and underlying search category, which may reduce null results and increase accuracy of retrieval results for search queries-even if the query terms are outside of manually curated keywords.

In some embodiments, the interpretation techniques of the present disclosure may be performed automatically using one or more machine learning techniques. For instance, using some of the techniques of the present disclosure, relationships between contextual information and taxonomy categories may be automatically derived through semantic embedding. This, in turn, reduced manual interventions while building specialty indices that are easily scalable and modifiable. For instance, deep learning embedding models may be leveraged to enhance, monitor, and refresh a generalized taxonomy. In this way, quick and accurate information enhancement may be performed with minimum human efforts in the loop.

Moreover, some of the techniques of the present disclosure leverage up-to-date data to refine an enhanced taxonomy to accommodate changes in behavior of a population of users that perform search queries. For instance, an enhanced taxonomy may be generated using interaction datasets reflective of user behaviors over time. In some embodiments, the interaction dataset may be continuously refined, updated, and/or refreshed to generate current data reflective of a population's current behavior. This data may be leveraged to intelligently enhance a generalized taxonomy with respect a current population's anticipated requirements. By doing so, some techniques of the present disclosure improve upon static taxonomies that are prone to output out-of-date results that are irrelevant to a particular search query.

In addition, or alternatively, evaluation metrics may be continuously generated for the enhanced taxonomy. The evaluation metrics may continuously measure a performance of the enhanced taxonomy and enable the dynamic modification of taxonomy parameters based on the enhanced taxonomy's performance over time. This, in turn, enables the intelligent regeneration of enhanced taxonomies to maintain a desired level of performance for various search engines across various search domains.

Examples of technologically advantageous embodiments of the present disclosure include: (i) interpretation techniques for generating enhanced taxonomies to improve search engine performance; (ii) search resolution techniques for leveraging an enhanced taxonomy to generate granular search resolutions; (iii) performance monitoring techniques for continuously and dynamically updating query resolution parameters based on the real time data among other aspects of the present disclosure. Other technical improvements and advantages may be realized by one of ordinary skill in the art.

V. Example System Operations

As indicated, various embodiments of the present disclosure make important technical contributions to computer interpretation and query resolution technologies. In particular, systems and methods are disclosed herein that semantic mapping technique for intelligently enhancing generalize taxonomies. Unlike traditional query resolution techniques, the semantic mapping techniques of the present disclosure leverage improve generalize categories with deep contextual features that reduce null results, while increasing accuracy of retrieval results for search queries in various search domains.

Figure 3:
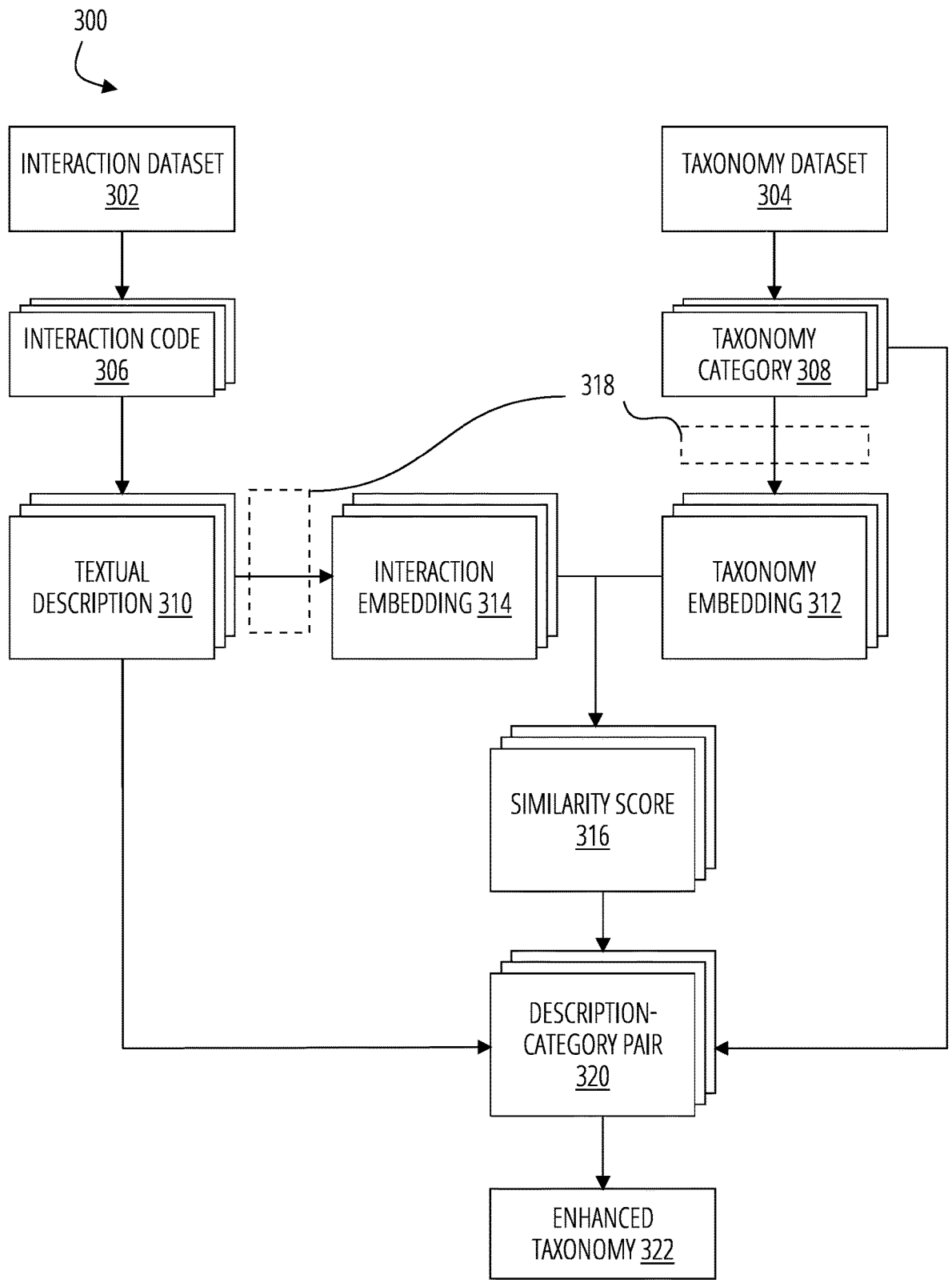
FIG. 3 is a dataflow diagram showing example data structures and modules for facilitating a semantic mapping technique in accordance with some embodiments discussed herein.

FIG. 3 is a dataflow diagram 300 showing example data structures and modules for facilitating a semantic mapping technique in accordance with some embodiments discussed herein. The dataflow diagram 300 depicts an intelligent mapping process for generating an enhanced taxonomy 322 from a taxonomy dataset 304 and an interaction dataset 302 by intelligently mapping interaction data objects to each of a plurality of taxonomy categories 308 of the interaction dataset 302.

In some embodiments, the taxonomy dataset 304 is a data entity that describes one or more search categories for a search domain. The taxonomy dataset 304, for example, may include a plurality of taxonomy categories 308. A taxonomy category 308 may be an attribute, field, and/or the like that is defined by the taxonomy dataset 304. For example, the taxonomy dataset 304 may include a taxonomy code, display name, grouping, specialization, classification, definition, and/or any other contextual information for identifying a sematic meaning of a search query. For instance, the taxonomy dataset 304 may define a plurality of taxonomy categories 308 that correspond to one or more types of potential search results for a search query. In this manner, the taxonomy dataset 304 may be leveraged to identify a type of search query and surface a query resolution based on the type of search query.

In some examples, the taxonomy dataset 304 may depend on the search domain. For example, in a clinical domain, a taxonomy dataset 304 may include a clinical dataset that defines a plurality of a specialization category. By way of example, the taxonomy categories 308 may be indicative of syntactic data that describes the type, classification, and/or specialization of a plurality of healthcare providers. In this way, the taxonomy dataset 304 may be leveraged to identify a type of healthcare providers for a search query and surface a query resolution with one or more healthcare providers of the identified type. In some examples, the taxonomy dataset 304 may be based on an open-source taxonomy. By way of example, the taxonomy dataset 304 may include and/or be based on an NUCC taxonomy.

In some embodiments, a taxonomy category 308 is a component of the taxonomy dataset 304. The taxonomy category 308, for example, may define a code, display name, grouping, specialization, classification, definition, and/or any other contextual information associated with a particular search query and/or one or more potential results for the search query. Each taxonomy category 308 may be indicative of a classification and/or one or more classification attributes. For instance, a taxonomy category 308 may include classification characterized by a name, description, one or more sub- and/or related classifications, and/or the like.

In some examples, the taxonomy category 308 may depend on the search domain. For example, in a clinical domain, the taxonomy category 308 may correspond to a clinical specialization. By way of example, a taxonomy category 308 may include a specialization category, one or more sub- and/or related specializations, a specialization name, a description of the specialization, and/or the like. In some examples, a taxonomy category 308 may include a category defined by an NUCC taxonomy.

In some embodiments, the interaction dataset 302 is a data entity that includes a plurality of interaction data objects. The interaction dataset 302 may include set of interaction data objects that are recorded over a time interval. For instance, the interaction dataset 302 may include a plurality of interaction data objects that are associated with a time interval. The time interval, for example, may be based on a refresh rate that defines one or more of one or more historical refresh times and/or one or more future refresh times for an enhanced taxonomy 322.

In some examples, the interaction dataset 302 may be based on a search domain. For example, in clinical domain, the interaction dataset 302 may include medical claim data with a plurality of historical medical claims across a population of users. In some examples, the medical claim data may be accessed from electronic health records (EHR) to collect a past medical history of events and/or interactions for a population of users. For instance, as described herein, the medical claims data may be indicative of a plurality of ICD and/or CPT codes referenced across a population of users over a time interval.

In some embodiments, an interaction data object is a data entity that describes a component of the interaction dataset 302. An interaction data object may include a recorded interaction for an individual. An interaction data object may depend on a search domain. For example, in a clinical domain, an interaction data object may include a medical claim, a medical record, and/or any other recorded medium that is descriptive of a medical event for an individual. In some embodiments, an interaction data object may include one or more interaction codes. In addition, or alternatively, the interaction data object may include contextual data associated with interaction codes 306.

In some embodiments, an interaction code 306 is an alpha-numerical reference that designates a particular aspect of an interaction. In a clinical domain, for example, an interaction code 306 may be based on one or more healthcare claim feature values that describe at least one of a healthcare claim's procedure type, diagnosis code, medical equipment, insurer requirements, physician deadlines, and/or the like. For example, an interaction code 306 may include an ICD code that is indicative of a diagnosis of a disease for an individual. In addition, alternatively, in a clinical domain, an interaction code 306 may include a CPT code that is indicative of a treatment for a condition of an individual. In some examples, a plurality of interaction data objects include a list of ICD codes and/or CPT codes, such as ICD-10-CM codes, and/or the like, that are recorded for an individual during a time interval. In some examples, each interaction code 306 may correspond to an event for an individual. The event, for example, may include a diagnosis for a disease corresponding to the interaction code 306. In some examples, the presence of the interaction code 306 within a plurality of interaction data objects may be indicative of the occurrence of an event (e.g., a disease diagnosis, a treatment) for an individual within a time interval.

In some embodiments, a plurality of interaction codes 306 are identified from the interaction dataset 302. The plurality of interaction codes 306 may include a primary interaction code from each of the interaction data objects. By way of example, in a clinical domain, a primary interaction code may include a first ICD and/or a first CPT code listed in a medical claim. The plurality of interaction codes 306 may be identified from an interaction dataset 302 that is gathered over a particular time interval. In this manner, the plurality interaction codes 306 may be adaptively changed over time to accommodate for changes within an environment.

In some embodiments, an interaction code 306 is associated with a particular textual description 310 that describes, elaborates, and/or details a condition and/or treatment associated with the interaction code 306. The textual description 310, for example, may include contextual information, such as medically relevant information in a clinical domain, for the interaction code 306. For example, the interaction code 306 may have a standardized textual description 310 explaining relevant clinical information such as the name, causes, symptoms, history, treatments, abnormal findings, etc., of a corresponding diagnosis, procedure, and/or the like. In this manner, the interaction code 306 may be used to identify contextual information, such as medically relevant information in a clinical domain, relating to an event recorded by an interaction code 306 within an interaction data object.

In some embodiments, a textual description 310 includes semantic content that elaborates on the meaning, purpose, and/or context of an entity. The textual description 310 may be based on a search domain. For example, in a clinical domain, the textual description 310 may include clinically relevant information. For instance, the textual description 310 may be a standardized and/or non-standardized description associated with a particular term code, listing, and/or the like. In some embodiments, the textual description 310 may be a description associated with a particular ICD-10 code, CPT code, and/or the like. In some examples, the textual description 310 comprises syntactic content associated with a particular ICD-10 code, CPT code, and/or the like.

In some embodiments, a plurality of interaction embeddings 314 are generated for a plurality of textual descriptions 310 corresponding to the plurality of interaction codes 306 identified within the interaction dataset 302.

In some embodiments, an embedding, such as the interaction embedding 314, is a data entity that describes a mathematical representation of textual information. An embedding may include a fixed-length vector that represents one or more encoded words, phrases, sentences, and/or the like. A plurality of embeddings may define a latent space in which information and relationships may be represented. Embeddings may be generated to transform text-based information into numerical representations for further computer-based processing, for example, in natural language processing applications. An embedding may capture raw information, summary information, semantic information, and/or the like. Embeddings may be used to match, compare, and/or interact with textual information in computer-based applications. For example, embeddings may be used to determine if two or more sentences are similar, for example, by the words they share and/or the meanings they convey. As described herein, a plurality of embeddings may be generated for a plurality of different sources of information. In some examples, embeddings may be generated for interaction codes 306, taxonomy categories 308, search queries, enhanced taxonomy categories, and/or the like.

In some embodiments, the interaction embeddings 314 include embeddings for the plurality of interaction codes 306. For example, each interaction embedding 314 may encode a plurality of features for a respective interaction code 306. In some examples, the plurality of features may include textual features described by a textual description 310 of an interaction code 306. By way of example, the interaction embeddings 314 may include a plurality of textual embeddings generated for the plurality of interaction codes 306 based on their corresponding textual descriptions 310.

In some embodiments, a plurality of taxonomy embeddings 312 are generated for the plurality of taxonomy categories 308 identified within the taxonomy dataset 304.

In some embodiments, a taxonomy embedding 312 is an embedding for a taxonomy category 308. For example, the taxonomy embedding 312 may encode a plurality of features for a respective taxonomy category 308. In some examples, the plurality of features may include textual features described by the taxonomy dataset 304 with respect to the taxonomy category 308. By way of example, a taxonomy embedding 312 may include a textual embedding generated for a taxonomy category 308 based on one or more classification attributes (e.g., name, description, one or more sub- and/or related classifications, etc.) corresponding to the taxonomy category 308.

In some embodiments, the plurality of taxonomy embeddings 312 and/or the plurality of interaction embeddings 314 are generated using a machine learning embedding model 318. In some examples, machine learning embedding model 318 may include the same model for each of the taxonomy embeddings 312 and/or interaction embeddings 314. In addition, or alternatively, a first model may be leveraged to generate the taxonomy embeddings 312 and a second, different model may be leveraged to generate the interaction embeddings 314.

In some embodiments, machine learning embedding model 318 is a data entity that describes parameters, hyper-parameters, and/or defined operations of a rules-based and/or machine learning model (e.g., model including at least one of one or more rule-based layers, one or more layers that depend on trained parameters, coefficients, and/or the like). The machine learning embedding model 318 may include one or more machine learning models configured, trained (e.g., jointly, separately, etc.), and/or the like to encode textual data into one or more embeddings. The machine learning embedding model 318 may include one or more of any type of machine learning model including one or more supervised, unsupervised, semi-supervised, reinforcement learning models, and/or the like. In some examples, the machine learning embedding model 318 may include multiple models configured to perform one or more different stages of an embedding process.

In some embodiments, the machine learning embedding model 318 is trained using one or more supervised training techniques. In some examples, the machine learning embedding model 318 may be trained to factorize one or more inputs, such as one or more text strings, to generate an embedded vector. In some examples, the machine learning embedding model 318 may be trained such that the model's latent space is representative of certain semantic domains/contexts, such as clinical domain. For example, the machine learning embedding model 318 may be trained to generate embeddings representative of one or more learned (and/or prescribed, etc.) relationships between one or more words, phrases, and/or sentences. By way of example, the machine learning embedding model 318 may represent a semantic meaning of a word and/or sentence differently in relation to other words and/or sentences, and/or the like. The machine learning embedding model 318 may include any type of embedding model finetuned on information for a particular search domain. By way of example, the machine learning embedding model may include one or more of SBERT, ClinicalBERT, BERT, Word2Vec, GloVe, Doc2Vec, InferSent, Universal Sentence Encoder, and/or the like. The machine learning embedding model 318 may be finetuned on the interaction dataset 302, a plurality of historical search queries, and/or the like.

In some embodiments, a plurality of similarity scores 316 are generated for a plurality of description-category pairs 320 based on a comparison between the plurality of interaction embeddings 314 and the plurality of taxonomy embeddings 312. In some examples, a similarity score of the plurality of similarity scores 316 may include a cosine similarity score.

In some embodiments, a description-category pair 320 is a tuple including a textual description 310 and taxonomy category 308. The description-category pair 320 may be associated with an interaction embedding (e.g., corresponding to a respective textual description 310 of an interaction code 306) and/or a taxonomy embedding 312 (e.g., corresponding to a respective taxonomy category 308). In some examples, a similarity score 316 may be generated for the description-category pair 320 based on the associated embeddings. In some examples, the description-category pair 320 may be representative of a textual description 310 that is a candidate for being mapped, associated, appended, and/or the like to a corresponding taxonomy category 308. In some examples, in the event that a similarity score 316 for the description-category pair 320 satisfies a threshold similarity score, a textual description 310 of the description-category pair 320 may be mapped, associated with, appended, and/or the like with the taxonomy category 308 of the description-category pair 320.

In some embodiments, the similarity score 316 is a data entity that describes a statistical measure of a strength of a relationship between two variables. In some examples, a similarity score 316 may include a semantic similarity score. For example, the similarity score 316 may be representative of a semantic similarity between two texts based on their associated embeddings. For instance, once data is converted to an associated embedding, the distance between two embeddings may be calculated to determine their similarity and/or dissimilarity. In some examples, embeddings that are closer in a vector space may be similar in semantic meaning. By way of example, a similarity score 316 between two embeddings may be computed according to cosine similarity according to the following equation:

$$\text{cosine similarity} = S_C(A, B) := \cos(\theta) = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}},$$

where A and B represent embedding vectors. The similarity score 316 may be a cosine similarity, a Euclidean distance, a dot product, and/or any other metric for measuring a similarity between two embeddings. In some examples, the similarity scores 316 for a plurality of description-category pairs 320 may be used to determine which among a plurality of pairs are most similar, for example, by selecting pairs with a highest similarity score.

In some embodiments, the enhanced taxonomy 322 is generated by augmenting one or more of the plurality of taxonomy categories 308 with one or more of the plurality of textual descriptions 310 based on the plurality of similarity scores 316. The enhanced taxonomy 322, for example, may include a plurality of augmented taxonomy categories. Each augmented taxonomy category may be generated by appending one or more respective textual descriptions 310 of the plurality of textual descriptions 310 to a corresponding taxonomy category 308. In some examples, the enhanced taxonomy 322 may be generated based on one or more thresholds, such as a threshold similarity score and/or a threshold redundancy value. For example, each of the one or more respective textual descriptions 310 for a taxonomy category 308 may be associated with a similarity score 316 that satisfies a threshold similarity score. In addition, or alternatively, a threshold redundancy value may be indicative of a threshold number of the taxonomy categories 308 that may be mapped to a particular textual description 310.

In some embodiments, the enhanced taxonomy 322 is a taxonomy dataset 304 that is augmented with a plurality of augmented taxonomy categories. Augmented taxonomy categories, for example, may include a taxonomy category 308 that is augmented with at least a portion of a textual description 310 corresponding to an associated interaction code 306. In some examples, an augmented taxonomy category is generated by mapping, associating with, appending, and/or the like a textual description 310 (at least a portion thereof) to a taxonomy category 308. In this manner, the taxonomy dataset 304 may be augmented to generate the enhanced taxonomy 322 with a plurality of augmented taxonomy categories. By increasing the contextual information for the taxonomy categories 308 of the taxonomy dataset 304, the enhanced taxonomy 322 may be leveraged to make more relevant and targeted connections between a search query and a plurality of potential search results. This, in turn, enable more accuracy query resolutions, while preventing null results that are predominant in traditional query resolution techniques.

In some embodiments, the threshold similarity score is a threshold metric associated with a similarity score. A threshold similarity score, for example, may include static and/or dynamic value, range of values, and/or the like that defines a target similarity score for associating a textual description and/or taxonomy category of a description-category pair. A threshold similarity score, for example, may include a preset value, such as 0.95, 0.96, 0.97, 0.99, and/or the like. In addition, or alternatively, the threshold similarity score may include a range of values, such as 0.95 to 0.99, and/or the like. In some examples, a textual description and/or taxonomy category of a description-category pair may be associated in the event that a similarity score for the description-category pair achieves (e.g., equals or exceed, etc.) the threshold similarity score.

In some examples, the threshold similarity score may be set and/or updated manually, automatically, algorithmically, as a parameter of a machine learning model, and/or the like. The threshold similarity score, for example, may be set and/or updated based on an evaluation metric. An evaluation metric may be used to evaluate, at least in part, the influence of different threshold similarity scores on an enhanced taxonomy's performance. In some embodiments, the threshold similarity score influences the performance of an enhanced taxonomy with respect to certain operations. Different values used for the threshold similarity scores may correspond to different evaluation metric values. The value selected for a threshold similarity score may be based on an evaluation metric. In some embodiments, a threshold similarity score may be arbitrarily and/or systematically set at some value and updated based on an evaluation metric. For example, a threshold similarity score may set to a value of 0.95, and later, the threshold similarity score may be updated to another value, for example, 0.94, 0.96, or any other value. If, for example, the threshold similarity score being updated to 0.96 corresponds with an increased evaluation metric value, it may be determined that the threshold similarity score should be 0.96.

In some embodiments, a similarity score between two or more embeddings must satisfy a threshold similarity score. For example, given a threshold similarity score of 0.95, it may be that only embeddings with similarity scores greater than 0.95 are further used and/or processed (e.g., 0.96, 0.97, 0.99, etc.). In an example, an embedding for a textual description is compared with an embedding for a taxonomy category in a description-category pair by their similarity score. If the similarity score fails to satisfy the threshold similarity score, the textual description is not mapped to the corresponding taxonomy category. In another example, an embedding for a textual description is compared with an embedding for a taxonomy category in a description-category pair by their similarity score. If the similarity score satisfies the threshold similarity score, the textual description is candidate for being mapped to corresponding taxonomy category.

In some embodiments, the threshold redundancy value is a threshold metric associated with a taxonomy category 308. For example, the threshold redundancy value may include a static and/or dynamic value, range of values, and/or the like that defines a target number of taxonomy categories 308 to which a textual description 310 may be mapped, associated, appended to, and/or the like. For instance, the threshold redundancy value may be indicative of a maximum number of taxonomy categories 308 that may be associated with a particular textual description 310 for a particular interaction code 306. In this manner, generalized textual descriptions 310 that are applicable to a plurality of taxonomy categories 308 may be constrained to subset of the related taxonomy categories 308 to prevent oversaturation of the enhanced taxonomy 322 with the prevalent textual descriptions 310.

A threshold redundancy value, for example, may include a preset value, such as three, four, ten, twenty, and/or the like. In addition, or alternatively, the threshold redundancy value may include a range of values, such as three to ten, and/or the like. In some examples, a textual description 310 may be mapped to a threshold number of taxonomy categories 308 as prescribed by the threshold redundancy value. In some examples, the textual description 310 may be mapped regardless of the threshold similarity score. In some examples, the textual description 310 may be mapped only if both the threshold similarity score and the threshold redundancy value are adhered to. For example, if a textual description 310 is mapped, associated, appended to, and/or the like to a threshold number of taxonomy categories 308 that satisfies the threshold redundancy value (e.g., equals or exceeds, etc.), the textual description 310 may be removed as a candidate for mapping, associating, appending to, and/or the like, additional taxonomy categories 308, even if satisfying the threshold similarity score.

In some embodiments, the threshold redundancy value may be set and/or updated manually, automatically, algorithmically, as a parameter of a machine learning model, and/or the like. The threshold redundancy value, for example, may be set and/or updated based on an evaluation metric. An evaluation metric may be used to evaluate, at least in part, the influence of different threshold redundancy values on an enhanced taxonomy's performance. In some embodiments, the threshold redundancy value influences the performance of an enhanced taxonomy 322 with respect to certain operations. Different values used for the threshold redundancy value may correspond to different evaluation metric values. The value chosen for the updated threshold redundancy value may be based on an evaluation metric. In some embodiments, a threshold redundancy value may be arbitrarily or systematically set at some value and updated based on an evaluation metric. For example, a threshold redundancy value may be set to a value of three, and later, the threshold redundancy value may be updated to another value, for example, two, four, and/or any other value. If, for example, the threshold redundancy value being updated to four corresponds with an increased evaluation metric value, the threshold redundancy value may be set to four.

In some embodiments, the performance of a query resolution operation may be initiated using the enhanced taxonomy 322. A query resolution operation may be performed to generate a query resolution for a search query. The enhanced taxonomy 322 may be leveraged to semantically map one or more query terms of the search query to one or more types of search queries (e.g., as defined by the enhanced taxonomy 322). Using these associations, a query resolution operation may generate a query resolution with a plurality of targeted query results corresponding to a particular type of search query.

In some embodiments, query resolution is a data entity that corresponds to a resolution of a search query. A query resolution, for example, may be generated in response to the initiation, execution, and/or processing of a search query through one or more query resolution operations. A search query, for example, may include one or more query terms. A query resolution may include a plurality of query result determined to be most relevant to the user based on the query terms. In some examples, the query results from a query resolution may be in the form of an answer, a curated list of facts or details, a suggestion, a link, and/or the like. By way of example, in a clinical domain, a user may input a search query, such as "my child's stomach hurts". In response, a query resolution may be generated, using the enhanced taxonomy 322, that includes a list of healthcare providers and/or their associated information. The query resolution may receive healthcare providers' associated information from the enhanced taxonomy 322 in response to a determination that those healthcare providers have provided treatments associated with the search query. For example, in response to the search query, "my child's stomach hurts", information about healthcare providers associated with treatments for upper abdominal pains and pediatrics may be returned.

In some examples, the performance of a search query resolution may vary over time based on a relevance of the enhanced taxonomy 322 with respect to user queries provided for resolution. In some embodiments, the enhanced taxonomy 322 is evaluated to monitor the efficacy of the enhanced taxonomy 322 at one or more point in time. For example, the enhanced taxonomy 322 may be evaluated using one or more query performance evaluation techniques. An example of a query performance evaluation technique will now further be described with reference to FIG. 4.

Figure 4:
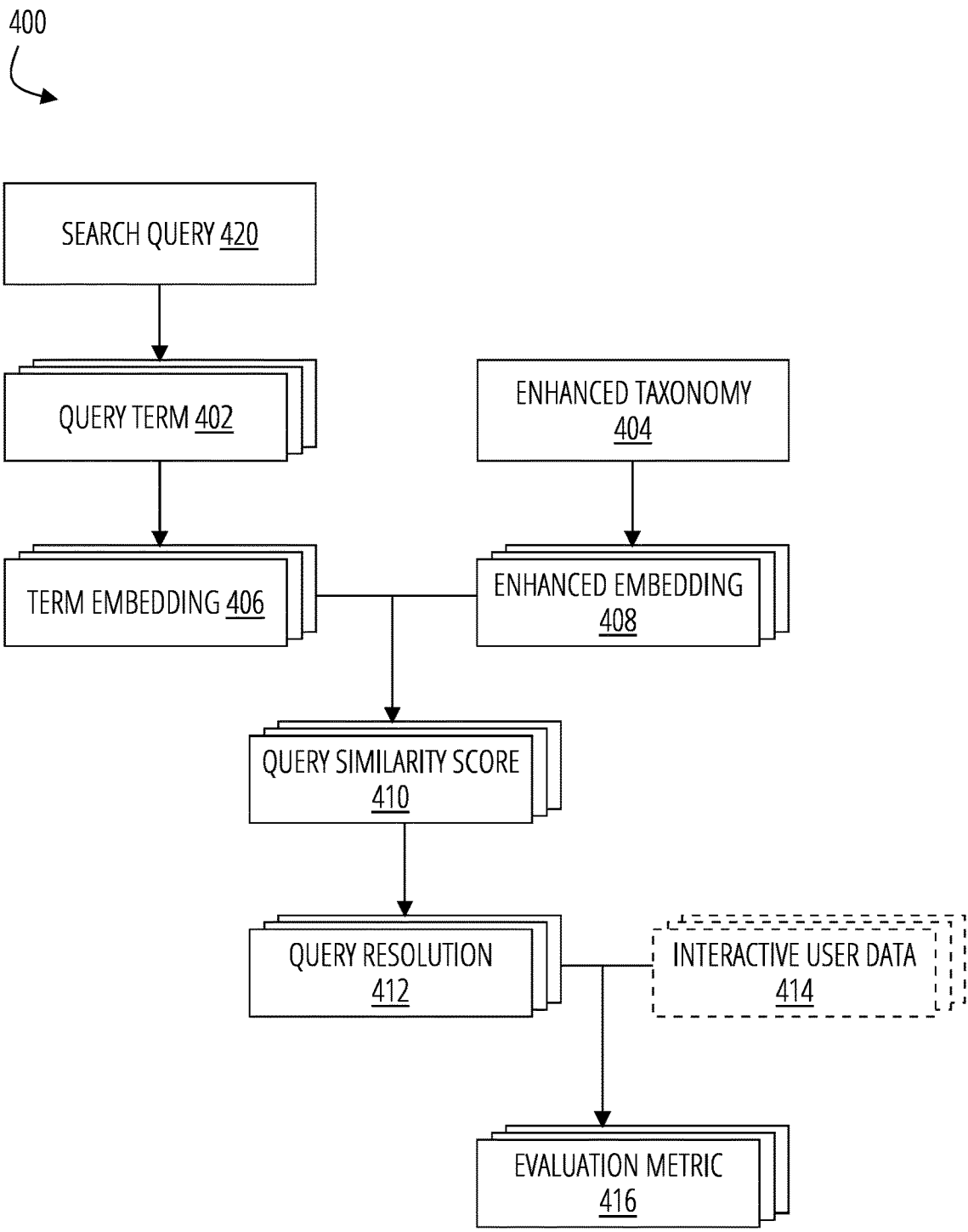
FIG. 4 is a dataflow diagram showing example data structures and modules for a query performance evaluation technique in accordance with some embodiments discussed herein.

FIG. 4 is a dataflow diagram 400 showing example data structures and modules for a query performance evaluation technique in accordance with some embodiments discussed herein. The dataflow diagram 400 shows an evaluation process for generating an evaluation metric 416 for the enhanced taxonomy 322.

In some embodiments, the evaluation metric 416 is generated based on a plurality of query resolutions 412 using the enhanced taxonomy 322. A query resolution 412, for example, may be generated in response to a search query 420. In some examples, the query resolution 412 may be generated based on a semantic similarity between one or more query terms 402 and the enhanced taxonomy 322.

In some embodiments, one or more term embeddings 406 may be generated for the search query 420. The term embeddings 406, for example, may be generated for one or more query terms 402 of the search query 420. In some examples, the term embeddings 406 may be generated using the machine learning embedding model 318.

In some embodiments, a search query 420 is a data entity that describes textual information indicative of a request for information. The textual information may be input by a user through one or more user interfaces (e.g., typed through a keyboard, etc., transcribed from one or more audio inputs, and/or the like). The search query 420 may include a plurality of query terms 402 that are indicative of one or more features of the search query 420.

In some embodiments, a query term 402 is a data entity that describes a unit of text from a search query 420. A query term 402 may include a keyword, phrase, and/or the like from the search query 420. By way of example, a query term 402 may include one or more words and/or phrases extracted from the search query 420 using one or more text extraction techniques (e.g., machine learning extraction models, rule-based extraction models, and/or the like).

In some embodiments, a term embedding 406 is an embedding for a query term 402. For example, a term embedding 406 may encode a plurality of features for a respective query term 402 and/or search query 420 associated therewith. In some examples, the plurality of features may include textual features described by the search query 420, one or more contextual features associated with query term 402 (e.g., a position of the term, a semantic meaning for the term, one or more associated terms, such as synonyms, etc.), and/or the like.

In some embodiments, a plurality of query similarity scores 410 may be generated for the search query 420 based on the query terms 402 and using the enhanced taxonomy 322. For instance, the query similarity scores 410 may be generated for a plurality of query-augmented category pairs. The query-augmented pairs, for example, may include a query term 402 and an augmented taxonomy category from the enhanced taxonomy 322. The query similarity scores 410 may be based on a comparison between the term embeddings 406 and a plurality of enhanced embeddings 408 from the enhanced taxonomy 322. For example, a query similarity score 410 for a query-augmented pair may include a similarity score (e.g., cosine similarity score, etc.) between a term embedding 406 corresponding to a query term 402 of the query-augmented pair and an enhanced embedding 408 corresponding to an augmented taxonomy category from the enhanced taxonomy 322.

In some embodiments, the enhanced embedding 408 is an embedding for an augmented taxonomy category from the enhanced taxonomy 322. For example, an enhanced embedding 408 may encode a plurality of features for a respective augmented taxonomy category. In some examples, the plurality of features may include textual features described by the enhanced taxonomy with respect to the augmented taxonomy category. By way of example, an enhanced embedding 408 may include a textual embedding generated for an augmented taxonomy category based on one or more classification attributes (e.g., name, description, one or more sub- and/or related classifications, etc.) corresponding to the augmented taxonomy category and/or one or more textual descriptions for one or more interaction codes associated with the augmented taxonomy category.

In some embodiments, a query-augmented category pair is a tuple including at least one query term 402 and an augmented taxonomy category. A query-augmented category pair may be associated with a term embedding 406 (e.g., corresponding to a respective query term 402) and/or an enhanced embedding 408 (e.g., corresponding to a respective augmented taxonomy category). In some examples, a query similarity score 410 may be generated for a query-augmented category pair based on the associated embeddings. In some examples, a query-augmented category pair may be representative of an augmented taxonomy category that is a candidate for being associated with a search query 420. For example, query-augmented category pairs may be representative of augmented taxonomy categories that are candidates for being used in a query resolution 412 associated with the corresponding search query 420. By way of example, if a query similarity score 410 is generated for a query-augmented category pair satisfies one or more thresholds, information from the augmented taxonomy category may be leveraged to generate one or more search results for the query resolution 412.

In some embodiments, the query similarity score 410 is a data entity that describes a statistical measure of a strength of a relationship between two variables. In some examples, the query similarity score 410 may include a semantic similarity score between a query term 402 and/or an augmented taxonomy category. For example, the query similarity score 410 may be representative of a semantic similarity between the query term 402 and/or the augmented taxonomy category based on their associated embeddings. The query similarity score 410, for example, may be a cosine similarity, a Euclidean distance, a dot product, and/or any other metric for measuring a similarity between two embeddings.

In some embodiments, a query resolution 412 is generated for the search query 420 based on the plurality of query similarity scores 410. In some examples, the query resolution 412 may include a plurality of query results to the search query 420 (e.g., historical, current, etc.).

In some embodiments, the evaluation metric 416 is generated based on a comparison between a plurality of query resolutions 412 and interactive user data 414. The interactive user data 414 may be indicative of a selection of one or more query results of a query resolution 412. In some examples, the evaluation metric 416 may include a recall metric that is based on a number of selections from the plurality of query resolutions 412. By way of example, the recall metric may be calculated as a number of matching results between a plurality of query resolutions generated using the enhanced taxonomy and a reference query resolution divided by a total number of results considered from the reference query resolution.

In some embodiments, the interactive user data 414 is a data entity that describes one or more user interactions with the query resolution 412. The user interactions, for example, may include one or more selections (e.g., clicks, keyboard strokes, and/or the like) of one or more query results of a query resolution 412. In some examples, interactive user data may be used to recreate historical query resolutions. For example, a reference query resolution may have a plurality of associated interactive user data including search queries and/or query results. Such interactive user data may be leveraged to recreate similar query resolutions, for example, using the enhanced taxonomy 322. In some examples, the interactive user data 414 may be compared to a plurality of query resolutions 412 to generate an evaluation metric 416 for the enhanced taxonomy 322.

In some embodiments, an evaluation metric 416 is a data entity that describes a statistical measure of the performance of a query resolution technique (e.g., implemented on one or more different computing systems). For example, the evaluation metric 416 may be used to measure a retrieval rate for query resolution technique that leverages the enhanced taxonomy 322. As an example, the evaluation metric 416 may include a recall metric according to the following equation:

$$r = \frac{\text{\# of our recommendations that are relevant}}{\text{\# of all the possible relevant items}}$$

In some examples, the evaluation metric 416 is indicative of a performance of the enhanced taxonomy 322 with respect to query resolution operations. For example, changing parameters, values, or the composition of the enhanced taxonomy 322 may yield different evaluation metric values. An evaluation metric 416 may be used to evaluate, at least in part, the influence of different data, parameters and/or compositions on an enhanced taxonomy's performance. In some examples, the evaluation metric 416 is a recall metric for the enhanced taxonomy 322 that is generated based on a plurality of received historical query resolutions and interactive user data 414 indicative of a user's interaction with the historical query resolutions. The interactive user data 414, for example, may be leveraged as ground truths for comparing the efficacy of a particular query resolution 412.

In some examples, a plurality of reference query resolutions is received from a reference query resolution technique that performs query resolution operations without the enhanced taxonomy 322. In some examples, the plurality of query resolutions 412 are received from an enhanced query resolution technique that performs query resolution operations with the enhanced taxonomy 322. In addition, or alternatively, enhanced interactive user data may be received for the enhanced query resolutions. In some examples, to evaluate the performance of the enhanced taxonomy 322, an evaluation metric 416 may be generated based on a comparison between the reference query resolutions and the query resolutions 412. In some examples, the evaluation metric 416 may be calculated as the number of matching results between the plurality of reference query resolutions and query resolutions 412 divided by the total number of possible query resolutions.

In some examples, the evaluation metric 416 is leveraged to refine, refresh, and/or evaluate the enhanced taxonomy 322. For instance, the evaluation metric 416 may be received and, responsive to the evaluation metric 416, a refresh operation may be initiated for the enhanced taxonomy 322. In addition, or alternatively, one or more of the threshold redundancy value and/or threshold similarity score may be updated based on the evaluation metric 416.

In some embodiments, a refresh operation includes one or more operations for updating, replacing, and/or regenerating certain data, features, parameters, calculations, machine learning models, enhanced taxonomies 322, evaluation metrics 416, and/or the like. For example, a refresh operation may include updating similarity scores based on new data, a new threshold similarity score, and/or a new threshold redundancy value. In some examples, a refresh operation may include updating the enhanced taxonomy 322 based on new data such as, for example, new textual descriptions, a new interaction dataset, a new taxonomy dataset, and/or the like. In some examples, a refresh operation may include updating the enhanced taxonomy 322 based on a new evaluation metric, new taxonomy categories, new reference query resolutions, and/or the like.

In some examples, a refresh operation may be configured to execute at certain refresh rate. A refresh rate may be defined by a frequency and/or time interval at which the updating, replacing, and/or regenerating of certain data, features, parameters, calculations, machine learning models, enhanced taxonomies 322, evaluation metrics 416, and/or the like may be executed. In some examples, a refresh operation may be performed manually, automatically, and/or algorithmically. For example, an interaction dataset may be defined by a time interval, such that it is updated with new interaction data objects at a frequency defined by the time interval. In some examples, a refresh operation may be initiated manually, automatically and/or algorithmically based on a threshold performance value. For example, if an evaluation metric based on an enhanced taxonomy fails to satisfy a threshold performance value, a refresh operation may be initiated. In some examples, one or more metrics, such as the evaluation metrics 416, may be recalculated using new parameters, thresholds, underlying data, and/or the like.

In some embodiments, a historical refresh time is indicative of a historical time interval that at least partially precedes a current time interval. For example, a historical refresh time may be indicative of a time interval corresponding to a historical refresh operation. The historical refresh operation may be executed based on data within the historical refresh time, such as historical interaction data that is received and/or dated three months, six months, twelve months, and/or the like before a current time.

In some embodiments, a subsequent refresh time is indicative of a subsequent time interval that at least partially proceeds a current time interval. For example, a subsequent refresh time may be indicative of a time interval corresponding to a subsequent refresh operation (e.g., a planned refresh operation, etc.). The subsequent refresh operation may be executed based on data within the subsequent refresh time, such as subsequent interaction data that is received and/or dated for three months, six months, twelve months, and/or the like after a current time.

In some embodiments, the historical query resolutions include query resolutions received from a historical refresh time that at least partially precedes a current time interval. Historical query resolutions, for example, may include query resolutions defined by a time interval preceding the current time interval during which a plurality of query resolutions were performed.

In some embodiments, a threshold performance value is a threshold for an evaluation metric 416. For example, given a threshold performance value of 0.75, it may be that only enhanced taxonomies 322 with evaluation metrics greater than 0.75 are further used and/or processed (e.g., 0.76, 0.77, 0.78, etc.). In another example, a refresh operation may be initiated in response to an evaluation metric 416 for an enhanced taxonomy 322 failing to satisfy a threshold performance value.

In some embodiments, the threshold performance value may be set and/or updated manually, automatically, algorithmically, as a parameter of a machine learning model, and/or the like. The threshold performance value may be set and/or updated based on a plurality of evaluation metrics 416. For example, a threshold performance value may be set to a value of 0.75, and later, the threshold performance value may be updated to another value, for example, 0.74, 0.76, or any other value.

Figure 5:
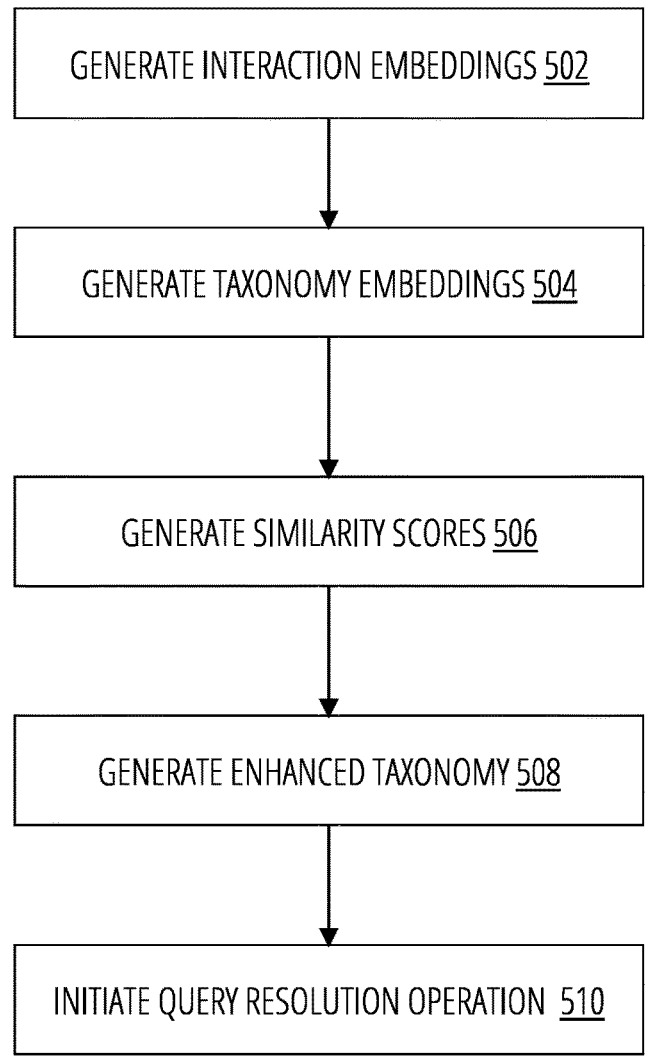
FIG. 5 is a flowchart showing an example of a process for generating an enhanced taxonomy in accordance with some embodiments discussed herein.

FIG. 5 is a flowchart showing an example of a process 500 for generating an enhanced taxonomy in accordance with some embodiments discussed herein. The flowchart depicts a semantic mapping process for generating an enhanced taxonomy with additional contextual information for improving query resolutions with respect to traditional query resolution techniques. The process 500 may be implemented by one or more computing devices, entities, and/or systems described herein. For example, via the various steps/operations of the process 500, the computing system 100 may generate, leverage, and/or monitor the performance of an enhanced taxonomy capable of improving query resolutions by reducing null results, while tailoring search results to contextual details underlying a search query. By way of example, unlike traditional query resolution techniques, the enhanced taxonomy may be capable of encoding contextual information, such as relevant user interactions, and/or the like, that account for up-to-date behavioral characteristics for a population.

FIG. 5 illustrates an example process 500 for explanatory purposes. Although the example process 500 depicts a particular sequence of steps/operations, the sequence may be altered without departing from the scope of the present disclosure. For example, some of the steps/operations depicted may be performed in parallel or in a different sequence that does not materially impact the function of the process 500. In other examples, different components of an example device or system that implements the process 500 may perform functions at substantially the same time or in a specific sequence.

In some embodiments, the process 500 includes, at step/operation 502, generating interaction embeddings. For example, a computing system 100 may generate a plurality of interaction embeddings for a plurality of textual descriptions corresponding to a plurality of interaction codes identified within an interaction dataset. The interaction dataset may include a plurality of interaction data objects that are associated with a time interval. The time interval, for example, may be based on a refresh rate that defines one or more of one or more historical refresh times and/or one or more future refresh times for the enhanced taxonomy.

In some embodiments, the process 500 includes, at step/operation 504, generating taxonomy embeddings. For example, a computing system 100 may generate a plurality of taxonomy embeddings for a plurality of taxonomy categories identified within a taxonomy dataset. In some examples, the plurality of taxonomy embeddings and/or the plurality of interaction embeddings are generated using a machine learning embedding model.

In some embodiments, the process 500 includes, at step/operation 506, generating similarity scores. For example, a computing system 100 may generate a plurality of similarity scores for a plurality of description-category pairs based on a comparison between the plurality of interaction embeddings and the plurality of taxonomy embeddings. In some examples, a similarity score of the plurality of similarity scores includes a cosine similarity score.

In some embodiments, the process 500 includes, at step/operation 508, generating an enhanced taxonomy. For example, a computing system 100 may generate an enhanced taxonomy by augmenting one or more of the plurality of taxonomy categories with one or more of the plurality of textual descriptions based on the plurality of similarity scores. In some examples, the enhanced taxonomy may be generated based on a threshold similarity score and/or a threshold redundancy value indicative of a threshold number of taxonomy categories for a particular textual description. The enhanced taxonomy may include a plurality of augmented taxonomy categories. An augmented taxonomy category may be generated by appending one or more respective textual descriptions of the plurality of textual descriptions to a corresponding taxonomy category. In some examples, each of the one or more respective textual descriptions may be associated with a similarity score that satisfies the threshold similarity score.

In some embodiments, the process 500 includes, at step/operation 510, initiating a query resolution. For example, a computing system 100 may initiate, using the enhanced taxonomy, the performance of a query resolution operation.

Some techniques of the present disclosure enable the generation of action outputs that may be performed to initiate one or more prediction-based actions to achieve real-world effects. The computer interpretation techniques of the present disclosure may be used, applied, and/or otherwise leveraged to generate an enhanced taxonomy, which may help in the computer interpretation and resolution of search queries. The enhanced taxonomy of the present disclosure may be leveraged to initiate the performance of various computing tasks that improve the performance of a computing system (e.g., a computer itself, etc.) with respect to various prediction-based actions performed by the computing system 100, such as for the resolution of search queries and/or the like. Example prediction-based actions may include the generation of a query resolutions tailored to a search query and/or one or more prediction-based actions derived from the query resolutions, such as the identification of a condition (e.g., medical condition, and/or the like) for which a prediction-based action may be initiated to automatically address.

In some examples, the computing tasks may include prediction-based actions that may be based on a search domain. A search domain may include any environment in which computing systems may be applied to achieve real-word insights, such as search predictions (e.g., query resolutions, etc.), and initiate the performance of computing tasks, such as prediction-based actions to act on the real-world insights (e.g., derived from query resolutions, etc.). These prediction-based actions may cause real-world changes, for example, by controlling a hardware component, providing alerts, interactive actions, and/or the like.

Examples of search domains may include financial systems, clinical systems, autonomous systems, robotic systems, and/or the like. Prediction-based actions in such domains may include the initiation of automated instructions across and between devices, automated notifications, automated scheduling operations, automated precautionary actions, automated security actions, automated data processing actions, and/or the like.

In some embodiments, the interpretation techniques of the process 600 are applied to initiate the performance of one or more prediction-based actions. A prediction-based action may depend on the prediction domain. In some examples, the computing system 100 may leverage the interpretation techniques to initiate the resolution of a search query, and/or the like.

Figure 6:
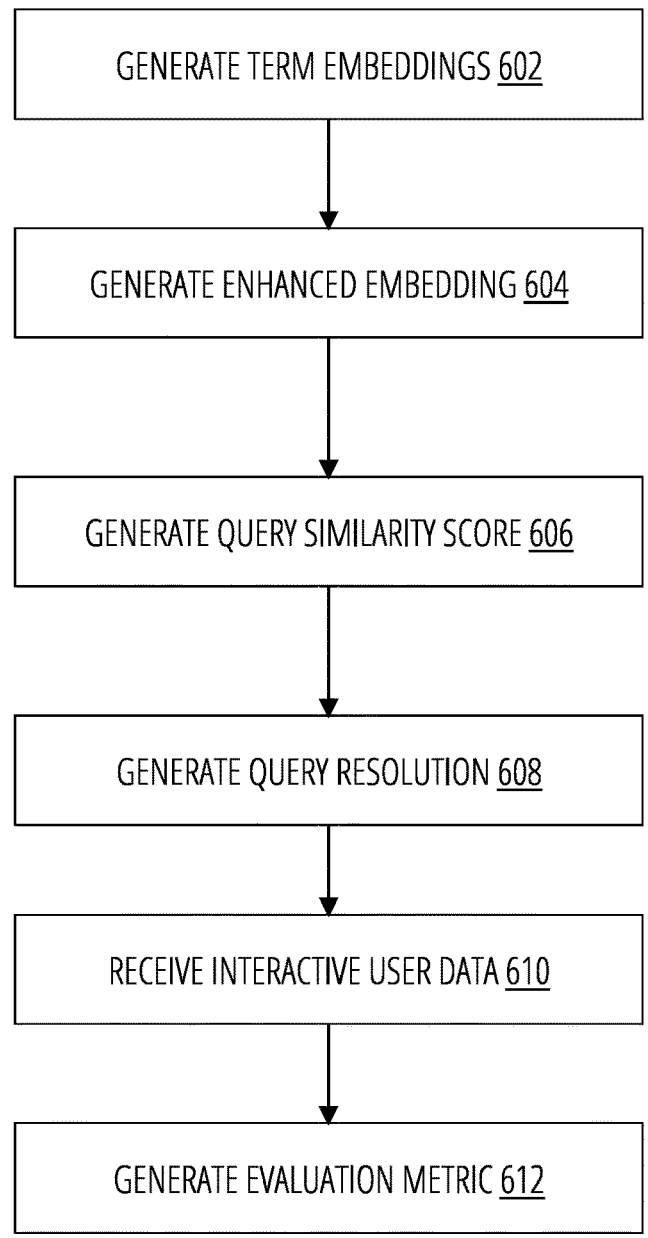
FIG. 6 is a flowchart showing an example of a process for evaluating a performance of an enhanced taxonomy in accordance with some embodiments discussed herein.

FIG. 6 is a flowchart showing an example of a process 600 for evaluating a performance of an enhanced taxonomy in accordance with some embodiments discussed herein. The flowchart depicts an evaluation process for generating an evaluation metric for an enhanced taxonomy that enables the continuous monitoring and refreshing of the enhanced taxonomy to overcome various limitations of traditional search query resolution techniques. The evaluation process may be implemented by one or more computing devices, entities, and/or systems described herein. For example, via the various steps/operations of the process 600, the computing system 100 may generate an evaluation metric for an enhanced taxonomy. By doing so, the computing system 100 may dynamically update one or more parameters (e.g., threshold similarity scores, threshold redundancy values, etc.) of the enhanced taxonomy to optimize query resolutions for a search query. Moreover, unlike traditional search resolution techniques, the evaluation process may be leveraged to dynamically refresh an enhanced taxonomy to accommodate changes within a population over time. This, in turn, results in more accurate query resolutions that adapt with a populations behavior over time.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, generating term embeddings. For example, the computing system 100 may generate one or more term embeddings for a search query (e.g., historical, current, anticipated, etc.).

In some embodiments, the process 600 includes, at step/operation 604, generating enhanced embeddings. For example, the computing system 100 may generate a plurality of enhanced embeddings for a plurality of augmented taxonomy categories of the enhanced taxonomy.

In some embodiments, the process 600 includes, at step/operation 606, generating query similarity scores. For example, the computing system 100 may generate, using the enhanced taxonomy, a plurality of query similarity scores for a search query based on a comparison between the one or more term embeddings and the plurality of enhanced embeddings from the enhanced taxonomy.

In some embodiments, the process 600 includes, at step/operation 608, generating query resolutions. For example, the computing system 100 may generating a query resolution for the search query based on the plurality of query similarity scores.

In some embodiments, the process 600 includes, at step/operation 610, receive interactive user data. For example, the computing system 100 may receive the interactive user data. The interactive user data may be indicative of a selection of one or more query results of a historical query resolution.

In some embodiments, the process 600 includes, at step/operation 612, generate evaluation metric. For example, the computing system 100 may generate the evaluation metric for the enhanced taxonomy. The evaluation metric may be based on a comparison between a plurality of historical query resolutions and the interactive user data corresponding to the plurality of historical query resolutions. In some examples, the evaluation metric may include a recall metric that is based on a number of selections from the plurality of historical query resolutions.

In some examples, the computing system 100 may update one or more of threshold similarity values and/or threshold redundancy values based the evaluation metric. In addition, or alternatively, the computing system 100 may receive the evaluation metric 416 for the enhanced taxonomy 322 and, responsive to the evaluation metric, initiate a refresh operation for the enhanced taxonomy.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method, the computer-implemented method comprising generating, by one or more processors, a plurality of interaction embeddings for a plurality of textual descriptions corresponding to a plurality of interaction codes identified within an interaction dataset; generating, by the one or more processors, a plurality of taxonomy embeddings for a plurality of taxonomy categories identified within a taxonomy dataset; generating, by the one or more processors, a plurality of similarity scores for a plurality of description-category pairs based on a comparison between the plurality of interaction embeddings and the plurality of taxonomy embeddings; generating, by the one or more processors, an enhanced taxonomy by augmenting one or more of the plurality of taxonomy categories with one or more of the plurality of textual descriptions based on the plurality of similarity scores; and initiating, by the one or more processors and using the enhanced taxonomy, the performance of a query resolution operation.

Example 2. The computer-implemented method of example 1, wherein the enhanced taxonomy comprises a plurality of augmented taxonomy categories and an augmented taxonomy category is generated by appending one or more respective textual descriptions of the plurality of textual descriptions to a corresponding taxonomy category.

Example 3. The computer-implemented method of example 2, wherein each of the one or more respective textual descriptions are associated with a similarity score that satisfies a threshold similarity score.

Example 4. The computer-implemented method of any of the preceding examples, wherein the interaction dataset comprises a plurality of interaction data objects that are associated with a time interval.

Example 5. The computer-implemented method of example 4, wherein the time interval is based on a refresh rate that defines one or more of one or more historical refresh times or one or more future refresh times for the enhanced taxonomy.

Example 6. The computer-implemented method of any of the preceding examples, further comprising generating an evaluation metric for the enhanced taxonomy, wherein the evaluation metric is based on a comparison between a plurality of historical query resolutions and interactive user data corresponding to the plurality of historical query resolutions; and updating one or more of a threshold similarity score or a threshold redundancy value based the evaluation metric.

Example 7. The computer-implemented method of example 6, wherein the interactive user data is indicative of a selection of one or more query results of a historical query resolution.

Example 8. The computer-implemented method of examples 6 or 7, wherein the evaluation metric comprises a recall metric that is based on a number of selections from the plurality of historical query resolutions.

Example 9. The computer-implemented method of any of the preceding examples, further comprising receiving an evaluation metric for the enhanced taxonomy; and responsive to the evaluation metric, initiating a refresh operation for the enhanced taxonomy.

Example 10. The computer-implemented method of any of the preceding examples, wherein the query resolution operation comprises generating one or more term embeddings for a search query; generating, using the enhanced taxonomy, a plurality of query similarity scores for the search query based on a comparison between the one or more term embeddings and a plurality of enhanced embeddings from the enhanced taxonomy; and generating a query resolution for the search query based on the plurality of query similarity scores.

Example 11. The computer-implemented method of any of the preceding examples, wherein the plurality of taxonomy embeddings and the plurality of interaction embeddings are generated using a machine learning embedding model.

Example 12. The computer-implemented method of any of the preceding example, wherein a similarity score of the plurality of similarity scores comprises a cosine similarity score.

Example 13. A computing system comprising memory and one or more processors communicatively coupled to the memory, the one or more processors configured to generate a plurality of interaction embeddings for a plurality of textual descriptions corresponding to a plurality of interaction codes identified within an interaction dataset; generate a plurality of taxonomy embeddings for a plurality of taxonomy categories identified within a taxonomy dataset; generate a plurality of similarity scores for a plurality of description-category pairs based on a comparison between the plurality of interaction embeddings and the plurality of taxonomy embeddings; generate an enhanced taxonomy by augmenting one or more of the plurality of taxonomy categories with one or more of the plurality of textual descriptions based on the plurality of similarity scores; and initiate, using the enhanced taxonomy, the performance of a query resolution operation.

Example 14. The computing system of example 13, wherein the enhanced taxonomy comprises a plurality of augmented taxonomy categories and an augmented taxonomy category is generated by appending one or more respective textual descriptions of the plurality of textual descriptions to a corresponding taxonomy category.

Example 15. The computing system of example 14, wherein each of the one or more respective textual descriptions are associated with a similarity score that satisfies a threshold similarity score.

Example 16. The computing system of any of examples 13 through 15, wherein the interaction dataset comprises a plurality of interaction data objects that are associated with a time interval.

Example 17. The computing system of example 16, wherein the time interval is based on a refresh rate that defines one or more of one or more historical refresh times or one or more future refresh times for the enhanced taxonomy.

Example 18. The computing system of any of examples 13 through 17, wherein the one or more processors are further configured to generate an evaluation metric for the enhanced taxonomy, wherein the evaluation metric is based on a comparison between a plurality of historical query resolutions and interactive user data corresponding to the plurality of historical query resolutions; and update one or more of a threshold similarity score or a threshold redundancy value based the evaluation metric.

Example 19. One or more non-transitory computer-readable storage media including instructions that, when executed by one or more processors, cause the one or more processors to generate a plurality of interaction embeddings for a plurality of textual descriptions corresponding to a plurality of interaction codes identified within an interaction dataset; generate a plurality of taxonomy embeddings for a plurality of taxonomy categories identified within a taxonomy dataset; generate a plurality of similarity scores for a plurality of description-category pairs based on a comparison between the plurality of interaction embeddings and the plurality of taxonomy embeddings; generate an enhanced taxonomy by augmenting one or more of the plurality of taxonomy categories with one or more of the plurality of textual descriptions based on the plurality of similarity scores; and initiate, using the enhanced taxonomy, the performance of a query resolution operation.

Example 20. The one or more non-transitory computer-readable storage media of example 19, wherein the plurality of taxonomy embeddings and the plurality of interaction embeddings are generated using a machine learning embedding model.

The invention claimed is:

1. A computer-implemented method, the computer-implemented method comprising:
    generating, by one or more processors, a plurality of interaction embeddings for a plurality of textual descriptions corresponding to a plurality of interaction codes identified within an interaction dataset;
    generating, by the one or more processors, a plurality of taxonomy embeddings for a plurality of taxonomy categories identified within a taxonomy dataset;
    generating, by the one or more processors, a plurality of similarity scores for a plurality of description-category pairs based on a comparison between the plurality of interaction embeddings and the plurality of taxonomy embeddings;
    generating, by the one or more processors, an enhanced taxonomy by augmenting one or more of the plurality of taxonomy categories with one or more of the plurality of textual descriptions based on the plurality of similarity scores;
    initiating, by the one or more processors and using the enhanced taxonomy, performance of a query resolution operation;
    generating, by the one or more processors, an evaluation metric for the enhanced taxonomy, wherein the evaluation metric is based on a comparison between (i) a plurality of historical query resolutions that comprises a query resolution associated with the query resolution operation and (ii) interactive user data corresponding to the plurality of historical query resolutions; and
    updating, by the one or more processors, one or more of a threshold similarity score or a threshold redundancy value based the evaluation metric.

2. The computer-implemented method of claim 1, wherein the enhanced taxonomy comprises a plurality of augmented taxonomy categories and an augmented taxonomy category is generated by appending one or more respective textual descriptions of the plurality of textual descriptions to a corresponding taxonomy category.

3. The computer-implemented method of claim 2, wherein each of the one or more respective textual descriptions are associated with a similarity score that satisfies a threshold similarity score.

4. The computer-implemented method of claim 1, wherein the interaction dataset comprises a plurality of interaction data objects that are associated with a time interval.

5. The computer-implemented method of claim 4, wherein the time interval is based on a refresh rate that defines one or more of one or more historical refresh times or one or more future refresh times for the enhanced taxonomy.

6. The computer-implemented method of claim 1, wherein the interactive user data is indicative of a selection of one or more query results of a historical query resolution.

7. The computer-implemented method of claim 1, wherein the evaluation metric comprises a recall metric that is based on a number of selections from the plurality of historical query resolutions.

8. The computer-implemented method of claim 1, further comprising:
    receiving an evaluation metric for the enhanced taxonomy; and
    responsive to the evaluation metric, initiating a refresh operation for the enhanced taxonomy.

9. The computer-implemented method of claim 1, wherein the query resolution operation comprises:
    generating one or more term embeddings for a search query;
    generating, using the enhanced taxonomy, a plurality of query similarity scores for the search query based on a comparison between the one or more term embeddings and a plurality of enhanced embeddings from the enhanced taxonomy; and
    generating a query resolution for the search query based on the plurality of query similarity scores.

10. The computer-implemented method of claim 1, wherein the plurality of taxonomy embeddings and the plurality of interaction embeddings are generated using a machine learning embedding model.

11. The computer-implemented method of claim 1, wherein a similarity score of the plurality of similarity scores comprises a cosine similarity score.

12. A computing system comprising memory and one or more processors communicatively coupled to the memory, the one or more processors configured to:
    generate a plurality of interaction embeddings for a plurality of textual descriptions corresponding to a plurality of interaction codes identified within an interaction dataset;
    generate a plurality of taxonomy embeddings for a plurality of taxonomy categories identified within a taxonomy dataset;
    generate a plurality of similarity scores for a plurality of description-category pairs based on a comparison between the plurality of interaction embeddings and the plurality of taxonomy embeddings;
    generate an enhanced taxonomy by augmenting one or more of the plurality of taxonomy categories with one or more of the plurality of textual descriptions based on the plurality of similarity scores;
    initiate, using the enhanced taxonomy, performance of a query resolution operation;
    generate an evaluation metric for the enhanced taxonomy, wherein the evaluation metric is based on a comparison between (i) a plurality of historical query resolutions that comprises a query resolution associated with the query resolution operation and (ii) interactive user data corresponding to the plurality of historical query resolutions; and
    update one or more of a threshold similarity score or a threshold redundancy value based the evaluation metric.

13. The computing system of claim 12, wherein the enhanced taxonomy comprises a plurality of augmented taxonomy categories and an augmented taxonomy category is generated by appending one or more respective textual descriptions of the plurality of textual descriptions to a corresponding taxonomy category.

14. The computing system of claim 13, wherein each of the one or more respective textual descriptions are associated with a similarity score that satisfies a threshold similarity score.

15. The computing system of claim 12, wherein the interaction dataset comprises a plurality of interaction data objects that are associated with a time interval.

16. The computing system of claim 15, wherein the time interval is based on a refresh rate that defines one or more of one or more historical refresh times or one or more future refresh times for the enhanced taxonomy.

17. One or more non-transitory computer-readable storage media including instructions that, when executed by one or more processors, cause the one or more processors to:
- generate a plurality of interaction embeddings for a plurality of textual descriptions corresponding to a plurality of interaction codes identified within an interaction dataset;
- generate a plurality of taxonomy embeddings for a plurality of taxonomy categories identified within a taxonomy dataset;
- generate a plurality of similarity scores for a plurality of description-category pairs based on a comparison between the plurality of interaction embeddings and the plurality of taxonomy embeddings;
- generate an enhanced taxonomy by augmenting one or more of the plurality of taxonomy categories with one or more of the plurality of textual descriptions based on the plurality of similarity scores;
- initiate, using the enhanced taxonomy, performance of a query resolution operation;
- generate an evaluation metric for the enhanced taxonomy, wherein the evaluation metric is based on a comparison between (i) a plurality of historical query resolutions that comprises a query resolution associated with the query resolution operation and (ii) interactive user data corresponding to the plurality of historical query resolutions; and
- update one or more of a threshold similarity score or a threshold redundancy value based the evaluation metric.

18. The one or more non-transitory computer-readable storage media of claim 17, wherein the plurality of taxonomy embeddings and the plurality of interaction embeddings are generated using a machine learning embedding model.

* * * * *